(12) United States Patent
Kisaka et al.

(10) Patent No.: US 8,514,881 B2
(45) Date of Patent: Aug. 20, 2013

(54) DIGITAL TRANSMISSION SYSTEM AND DIGITAL TRANSMISSION METHOD

(75) Inventors: Yoshiaki Kisaka, Yokosuka (JP); Takuya OHara, Yokosuka (JP); Shigeki Aisawa, Yokosuka (JP); Yutaka Miyamoto, Yokosuka (JP); Kazuhito Takei, Yokohama (JP); Yasuyuki Endoh, Yokohama (JP); Katsuyoshi Miura, Yokohama (JP); Tadanobu Nikaido, Yokohama (JP); Masahito Tomizawa, Yokohama (JP)

(73) Assignees: Nippon Telegraph and Telephone Corporation, Tokyo (JP); NTT Electronics Corporation, Kanagawa (JP)

( * ) Notice: Subject to any disclaimer, the term of this patent is extended or adjusted under 35 U.S.C. 154(b) by 892 days.

(21) Appl. No.: 12/522,895

(22) PCT Filed: Jan. 16, 2008

(86) PCT No.: PCT/JP2008/050433
§ 371 (c)(1),
(2), (4) Date: Dec. 11, 2009

(87) PCT Pub. No.: WO2008/087975
PCT Pub. Date: Jul. 24, 2008

(65) Prior Publication Data
US 2010/0080245 A1     Apr. 1, 2010

(30) Foreign Application Priority Data

Jan. 17, 2007   (JP) ................................ 2007-008298
Jan. 17, 2007   (JP) ................................ 2007-008299

(51) Int. Cl.
*H04J 3/16*       (2006.01)

(52) U.S. Cl.
USPC ............................ 370/465; 370/242; 370/476

(58) Field of Classification Search
None
See application file for complete search history.

(56) References Cited

U.S. PATENT DOCUMENTS 4,899,339 A *   2/1990   Shibagaki et al. ............. 370/431
7,143,161 B2 *   11/2006   Brissette ....................... 709/224
(Continued)

FOREIGN PATENT DOCUMENTS

| JP | 2002-199042 B2 | 7/2002 |
| JP | 2002-217940 A | 8/2002 |
| JP | 2002-247073 A | 8/2002 |
| JP | 2003-188843 A | 7/2003 |

(Continued)

OTHER PUBLICATIONS

ITU-T G.707, "Network node interface for the synchronous digital hierarchy (SDH)", pp. 1-196.
(Continued)

*Primary Examiner* — Kevin C Harper
(74) *Attorney, Agent, or Firm* — Fitch, Even, Tabin & Flannery LLP

(57) ABSTRACT

A digital transmission system includes at least a client device and a transmission device, and rate-adjusts the client signal transmitted from the client device to the transmission device before accommodating/multiplexing the signal in a frame. The transmission device includes a rate adjusting unit and a frame processing unit. The rate adjusting unit encapsulates the client signal by using a predetermined frame structure, inserts an idle pattern if necessary, and performs rate adjustment into the bit rate which can be contained in the frame. The frame processing unit accommodates/multiplexes the signal after the rate adjustment. The digital transmission system inserts a bit string of the client signal directly in a payload area of the digital frame, or accommodates and multiplexes it. Alternatively, a specific pattern is accommodated in the payload area, or accommodated and multiplexed after performing a reversible digital signal processing.

20 Claims, 24 Drawing Sheets

(56) References Cited

U.S. PATENT DOCUMENTS

| | | | |
|---|---|---|---|
| 7,298,694 B2 | 11/2007 | Kamiya et al. | |
| 8,274,892 B2* | 9/2012 | Chiang et al. | 370/235 |
| 2003/0112833 A1 | 6/2003 | Kamiya | |
| 2004/0114638 A1 | 6/2004 | Matsuura et al. | |
| 2005/0117905 A1* | 6/2005 | Lee et al. | 398/79 |
| 2006/0104309 A1* | 5/2006 | Vissers et al. | 370/474 |
| 2007/0071443 A1* | 3/2007 | Fukumitsu et al. | 398/79 |

FOREIGN PATENT DOCUMENTS

| | | |
|---|---|---|
| WO | 02/067508 A1 | 8/2002 |
| WO | 2006/009732 A1 | 1/2006 |

OTHER PUBLICATIONS

ITU-T G.709, "Interfaces for the Optical Transport Network (OTN)", pp. 1-120.

ITU-T G.Sup43, "Transport of IEEE 10G Base-R in Optical Transport Networks (OTN)", pp. 1-24.

ITU-T G.7041, "Generic framing procedure (GFP)", pp. 1-66.

Ichino, Haruhiko, Terada, Kazuhiko, Kawai, Kenji, Ishida, Osamu, Kishine, Keishi, and Iwasaki, Noboru, Enhanced Network Signaling for 10 Gigabit Ethernet to Achieve a Lan-Wan Seamless Interface and its Implementation in the PHY-LSI/Transceiver Module, IJHSES, vol. 15, No. 3, pp. 191-228, 2005.

Search Report for counterpart application EP 08703294.2-1237 dated May 24, 2011.

Angel Molina, Lucent Technologies Network Systems, Germany, et al: "10GE Lanphy: bit-transparent mapping proposal for OTN; D 99"; ITU-T Study Period 2005-2008, International Telecommunication Union, Geneva; CH, vol. Study Group 15, Nov. 29, 2004, pp. 1-6, XP017407216.

* cited by examiner

WHEN ACCOMMODATING STM-64

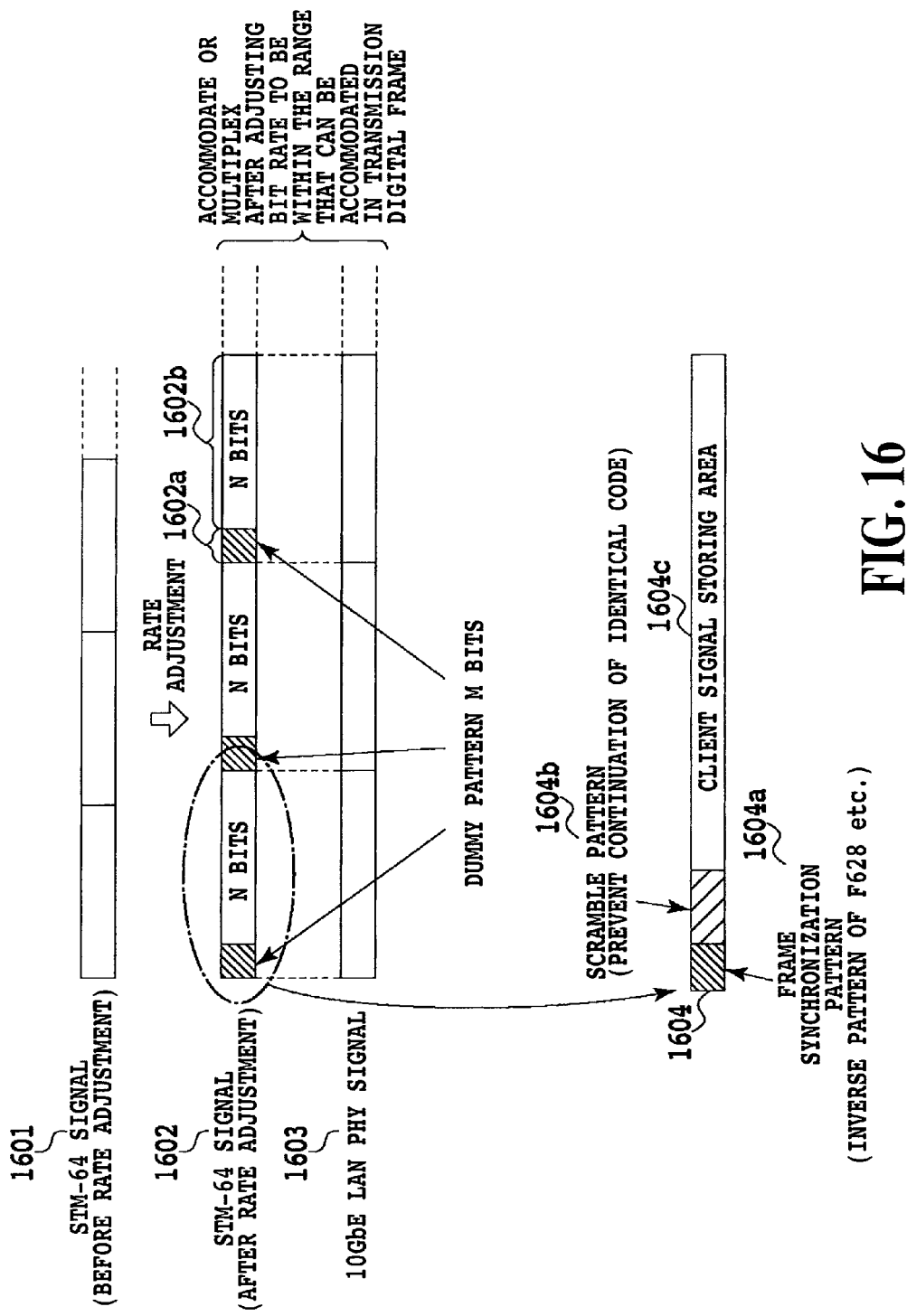

DIGITAL TRANSMISSION SYSTEM AND DIGITAL TRANSMISSION METHOD

CROSS-REFERENCE TO RELATED APPLICATIONS

This application is a U.S. national phase application of International Application No. PCT/JP2008/050433, filed Jan. 16, 2008, which claims benefit from Japanese Application No. 2007-008298, filed Jan. 17, 2007, and Japanese Application No. 2007-008299, filed Jan. 17, 2007, which are all hereby incorporated herein by reference in their entirety.

TECHNICAL FIELD

The present invention relates to a digital transmission system and a digital transmission method. More particularly, the invention relates to a digital transmission system and a digital transmission method in which a plurality of types of client signals are transmitted by accommodating or multiplexing the signals transparently.

BACKGROUND ART

Conventionally, digital transmission systems have been built to accommodate mainly telephone lines. SDH (Synchronous Digital Hierarchy), which is standardized by ITU-T, and SONET (Synchronous Optical Network), which is substantially the same standard as the SHD and is based on a U.S. ANSI standard, have been used as a digital hierarchy for transferring signals flowing through telephone lines efficiently, (cf. Non-patent Document 1).

Currently, data traffic has being increasing because of the spread of the Internet and so forth, in addition to the conventional voice traffic, and the data traffic has come to account for a large portion of the traffic. A variety of signals having various bit rates and formats have been standardized and used as the client signals accommodated in the network. For example, various client signals exist in the vicinity of 10 Gbit/s, such as 10 GbE LAN PHY (10.3125 Gbit/s), ODU2 (10.0373 Gbit/s), and STM-64 (9.95328 Gbit/s).

In view of such circumstances, the Optical Transport Network (OTN) (see Non-patent Document 2), which is predicated on wavelength division multiplexing transmission (WDM) system adaptable to an explosive increase of the Internet traffic, is standardized by the ITU-T as a platform for transparently transmitting various client signals such as ATM and Ethernet (registered trademark), not just SONET/SDH. For example, introduction of the network utilizing an OTN 1201 such as shown in FIG. 12 has been in progress rapidly.

FIG. 12 is a configuration diagram showing one example of a conventional network configuration. FIG. 12 shows that the OTN 1201 is connected to a SONET/SDH network 1202 and an Ethernet network 1203. More specifically, the OTN 1201 is connected to the SONET/SDH network 1202 via a transponder 1205 for SONET/SDH, which is provided in a transmission device 1204, and the OTN 1201 is also connected to the Ethernet network 1203 via a transponder 1207 for Ethernet, which is provided in a transmission device 1206.

In addition, user's need for transparent transmission, i.e., transmitting data in the original data form to a receiver in data communication, has been increasing in recent years. For example, the need for transparent transmission has been demonstrated by the fact that a scheme for transparently accommodating 10 GbE LAN PHY signal in the OTN platform (overclocked OTU2) has been discussed in the ITU-T and documented as G.Sup43 (see Non-patent Document 3).

Moreover, mechanisms for performing rate adjustment of a plurality of client signals are shown in GFP (Generic framing procedure) (see Non-patent Document 4), which is specified in ITU-T Recommendation G.7041, and Japanese Patent No. 3480444 (see Patent Document 1), which is an extension thereof. However, these have problems such that both of them are predicated on a specific encoding method (8B/10B encoding) and that they are incapable of transparent transmission.

Furthermore, there have been increasing demands for connecting LAN (Local Area Network) environments existing in remote locations directly with LAY-PHY (physical layer). In addition, there are users and device vendors who use the preamble and the inter frame gap (IFG) in the Ethernet signal with customized specifications that are different from the IEEE standard (see Non-patent Document 5). Therefore, carrier network is required to transparently transfer the entire signal including the preamble and the IFG, in addition to the frame, for some Ethernet signals whose bit rates are not multiples of integral.

However, the client signal of the OTN is predicated on the SONET/SDH signal. The bit rate of the client signal of the OTN is defined as 2.48832 Gbit/s, 9.95328 Gbit/s, and 39.81312 Gbit/s, which are different from the bit rates of the 1 GbE signal and the 10 GbE signal. An OTN to which the above-described overclocking scheme is applied is widely used as a method for transparently and efficiently accommodating 10 GbE LAN PHY signal, which has a different bit rate from the bit rate of the currently standardized OTN client signal. The application of the overclocking scheme refers to accommodating the 10 GbE LAN PHY signal with 10.3125 Gbit/s as it is as a client signal in the payload of the OTN without making any change to the frame structure and function of the OTN by increasing of the bit rate alone at a rate of 10.3125/9.95328.

FIG. 13 shows a configuration diagram of a digital transmission system, according to a conventional technique, in which a STM-64 signal and a 10 GbE LAN PHY signal are accommodated directly in a payload area of an OTU frame and transmitted by wavelength division multiplexing, and a configuration diagram of an OTU frame structure. When accommodating a 10 GbE LAN PHY signal 1302*a* in an OTU frame shown in the lower portion of FIG. 13, the overclocking scheme is applied in a transmission device 1304, and the bit rate is increased by adding an overhead, FS (Fixed Stuff) byte, and FEC, so that the 10 GbE LAN PHY signal is accommodated directly in the OTU frame with 11.0957 Gbit/s. The OTN is predicated on WDM, so a large capacity system can be realized by wavelength division multiplexing even if the bit rates differ at different wavelengths. For this reason, the OTN is used widely. Moreover, additional signal processing is unnecessary even when accommodating 10 GbE-LAN PHY signal, and efficient accommodating is possible at low cost. Therefore, this technique is documented in the ITU-T, as described above (see Non-patent Document 3).

As described referring to FIG. 12, when accommodating various client signals in the conventional network, respective transponders are prepared for respective client signals (the transponder 1205 for SONET/SDH and the transponder 1207 for Ethernet) to accommodate the client signals. Also, when accommodating the 10 GbE LAN PHY signal in the OTU frame using the overclocking scheme, the bit rate is different from the case where a STM-64 signal is accommodated, so a transmission signal having a plurality of bit rates need to be subjected to wavelength division multiplexing. However, preparing transponders (optical transmission-reception modules or frame processing circuits) corresponding to the types of client signals leads to the problems of lack of flexibility in transponder arrangement and also high cost.

In addition, in the conventional networks, rate adjustment was performed by decoding the encoded client signal and reducing the bit rate when handling a variety of both SDH-based and Ethernet-based client signals, for the reasons of, for example, the difference in bit rate between the client signal and the payload of the network which accommodates the signal. For example, a client signal using the 8B/10B encoding method is decoded so that the bit rate is reduced to 80%. Further, part of the client signal is deleted so that the rate is adjusted. For example, IFG is deleted when transferring a 10 GbE LAN PHY signal so that the bit rate is reduced. However, such methods in which the transparency is reduced have the problem that they cannot meet the recently increasing user's need for transparent transmission.

In addition, when multiplexing a client signal by a 40 Gbit/s OTN system, the difference in the bit rate cannot be permitted because a 10 Gbit/s signal is time-division multiplexed to a 40 Gbit/s signal. That is, although a normal 40 Gbit/s OTN system can multiplex-accommodate a STM-64 signal, it cannot multiplex-accommodate a 10 GbE LAN PHY signal, which has a different bit rate. In addition, although an overclocked 40 Gbit/s OTN system can multiplex-accommodate the 10 GbE LAN PHY signal, it cannot multiplex-accommodate the STM-64 signal. Therefore, a STM-64 signal and a 10 GbE LAN PHY signal cannot be allowed to coexist and multiplexed in a 40 Gbit/s signal with one wavelength. Therefore, there has been a problem that, in the case of transmitting a STM-64 signal and a 10 GbE LAN PHY signal separately, 2 wavelengths of 40 Gbit/s signals are necessary for wavelength division multiplexing of 40 Gbit/s in which STM-64 signals are multiplexed and 40 Gbit/s in which 10 GbE LAN PHY signals are multiplexed, so the trunking efficiency cannot be increased.

The invention has been accomplished in view of such problems. It is an object of the invention to provide a digital transmission system and a digital transmission method that are capable of accommodating, or accommodating and multiplexing, various client signals having different bit rates and that realize transparent transfer of various client signals at low cost and improved trunking efficiency.

[Patent Document 1] Japanese Patent No. 3,480,444
[Non-patent Document 1] ITU-T G.707, "Network node interface for the synchronous digital hierarchy (SDH)"
[Non-patent Document 2] ITU-T G.709, "Interfaces for the Optical Transport Network (OTN)"
[Non-patent Document 3] ITU-T G.Sup43, "Transport of IEEE 10G Base-R in Optical Transport Networks (OTN)"
[Non-patent Document 4] ITU-T G.7041, "Generic framing procedure (GFP)"
[Non-patent Document 5]H. Ichino et al., IJHSES, vol. 15, no. 3, pp. 191-228, 2005

DISCLOSURE OF THE INVENTION

A first aspect of the invention provides a digital transmission system for performing transmission and reception of a signal between a transmitter side network and a receiver side network, the transmitter side network comprising at least a client device and a transmission device, and for rate-adjusting a client signal transmitted from the client device to the transmission device as necessary and accommodating, or accommodating and multiplexing, to an accommodation rate, wherein: the transmission device comprises: a rate adjusting unit for adding, using a frame structure comprising an overhead with a predetermined fixed length and a payload, the overhead to the client signal and encapsulating the client signal, and adding an idle pattern as necessary, to the encapsulated client signal, to perform rate adjustment for the client signal to a bit rate that can be accommodated in the accommodation rate; and a framer processing unit for accommodating, or accommodating and multiplexing, the rate-adjusted encapsulated client signal to the accommodation rate, wherein: a bit string of the client signal is accommodated, or accommodated and multiplexed, directly in the payload portion, or is accommodated, or accommodated and multiplexed, in the payload portion after subjecting it to a reversible digital signal processing.

A second aspect of the invention provides a digital transmission method in a digital transmission system for performing transmission and reception of a signal between a transmitter side network and a receiver side network, the transmitter side network comprising at least a client device and a transmission device, and for rate-adjusting a client signal transmitted from the client device to the transmission device as necessary and accommodating, or accommodating and multiplexing, to an accommodation rate, wherein: the transmission device comprises: adding, using a frame structure comprising an overhead with a predetermined fixed length and a payload, the overhead to the client signal and encapsulating the client signal, and adding an idle pattern as necessary, to the encapsulated client signal, to perform rate adjustment for the client signal to a bit rate that can be accommodated in the accommodation rate; and accommodating, or accommodating and multiplexing, the rate-adjusted encapsulated client signal to the accommodation rate, wherein: a bit string of the client signal is accommodated, or accommodated and multiplexed, directly in the payload portion, or is accommodated, or accommodated and multiplexed, in the payload portion after subjecting it to a reversible digital signal processing.

A third aspect of the invention provides a digital transmission system for transmitting a plurality of types of client signals having different bit rates by accommodating or multiplexing the signals in a digital frame, and outputting the client signals by separating accommodated or multiplexed signals from the received digital frame, the digital transmission system comprising: rate adjusting means for rate-adjusting the bit rate of the plurality of types of client signals to a bit rate range that can be accommodated in the digital frame transparently by inserting a dummy pattern, using a specific fixed frame, into the fixed frame for client signals other than the client signal having the highest bit rate among the plurality of types of client signals to increase the bit rate of the client signals.

A fourth aspect of the invention provides a digital transmission method for transmitting a plurality of types of client signals having different bit rates by accommodating or multiplexing the signals in a digital frame, and outputting the client signals by separating accommodated or multiplexed signals from the received digital frame, wherein: the bit rate of the plurality of types of client signals is adjusted to a bit rate range that can be accommodated in the digital frame transparently by inserting a dummy pattern, using a specific fixed frame, into the fixed frame for client signals other than the client signal having the highest bit rate among the plurality of types of client signals to increase the bit rate of the client signals.

The invention makes it possible to provide a digital transmission system and a digital transmission method that are capable of accommodating, and accommodating and multiplexing, various client signals having different bit rates, and that realize transparent transfer of various client signals at low cost and improved trunking efficiency.

BRIEF DESCRIPTION OF THE DRAWINGS

FIG. 16 is a view showing a configuration example of a fixed frame for the rate adjustment for a STM-64 signal.

BEST MODE FOR CARRYING OUT THE INVENTION

Figure 1:
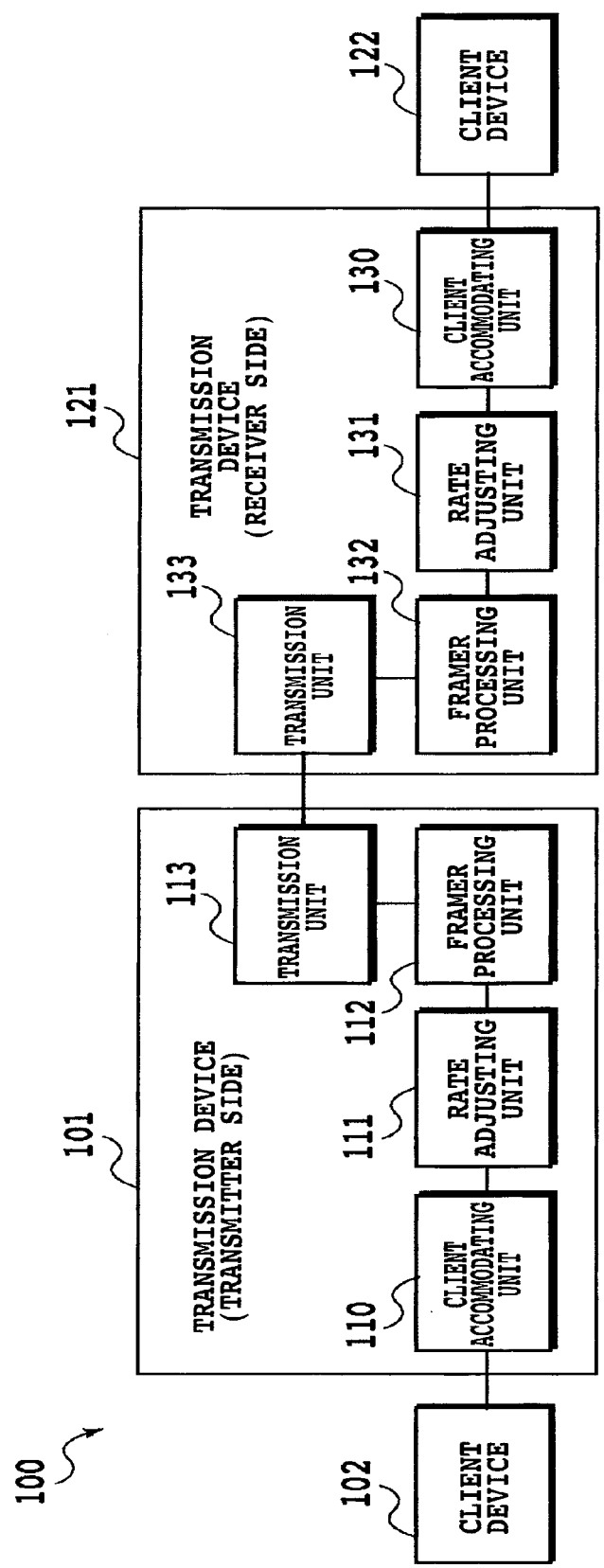
FIG. 1 is a block diagram for illustrating the outline of a digital transmission system according to one embodiment of the invention.

In the first and second aspects of the invention, when performing rate adjustment for a plurality of client signals as necessary, the bit rate of a client signal to be multiplexed is adjusted by inserting an idle pattern into the client signal, and thereafter, the signal is accommodated in a frame for transmission and multiplexed. More specifically, a plurality of client signals are encapsulated by using a frame structure for a specific rate adjustment, and also, an idle pattern is inserted into the client signal as necessary, to perform rate adjustment.

Moreover, in the first and second aspect of the invention, transparent transfer that is not predicated on a specific encoding method is achieved by accommodating, or accommodating and multiplexing, a bit string of a client signal directly in a payload portion, or by accommodating, or accommodating and multiplexing, the bit string in the payload portion after subjecting it to a reversible digital signal processing.

In the third and the fourth aspect of the invention, in order to ensure the transparency of the client signals, the bit sequence of the client signals is not subjected to any processing, and the rates are adjusted by, for example, adding a new overhead.

Hereinafter, embodiments of the invention will be described in detail with reference to the drawings. In the drawings referenced in this description, parts that have the same functions are denoted by the same reference numerals.

FIG. 1 is a block diagram for illustrating the outline of a digital transmission system 100 according to one embodiment of the invention. The digital transmission system 100 includes at least a transmission device 101 and a client device 102 in a transmitter side network and includes at least a transmission device 121 and a client device 122 in a receiver side network.

More specifically, the transmission device 101 has at least a client accommodating unit 110 for receiving a client signal from the client device 102, a rate adjusting unit 111 for rate-adjusting the received client signal and performing alarm transferring and performance monitoring for the client signal, a framer processing unit 112 for accommodating, or accommodating and multiplexing, the client signal after the rate adjustment in an accommodation rate, and a transmission unit 113 for transmitting the signal received from the framer processing unit 112 to the transmission device 121 in the receiver side network. Each of the transmission device 101 and the client device 102 has a CPU for controlling the devices in their interiors and also a memory for temporarily storing signals that are processed in the devices.

On the other hand, the transmission device 121 has a client accommodating unit 130, a rate adjusting unit 131, a framer processing unit 132, and a transmission unit 133. The transmission unit 133 transfers the client signal received from the transmission unit 113 to the framer processing unit 132. The framer processing unit 132 takes out a client signal from the transferred accommodation rate. The rate adjusting unit 131 puts the taken-out client signal back to the signal before the rate adjustment and performs later-described alarm transferring and performance monitoring for the client signal. The client accommodating unit 130 transmits the client signal received from the rate adjusting unit 131 to the client device 122. Each of the transmission device 121 and the client device 122 has a CPU for controlling the devices in their interiors and also a memory for temporarily storing signals that are processed in the devices.

Figure 2:
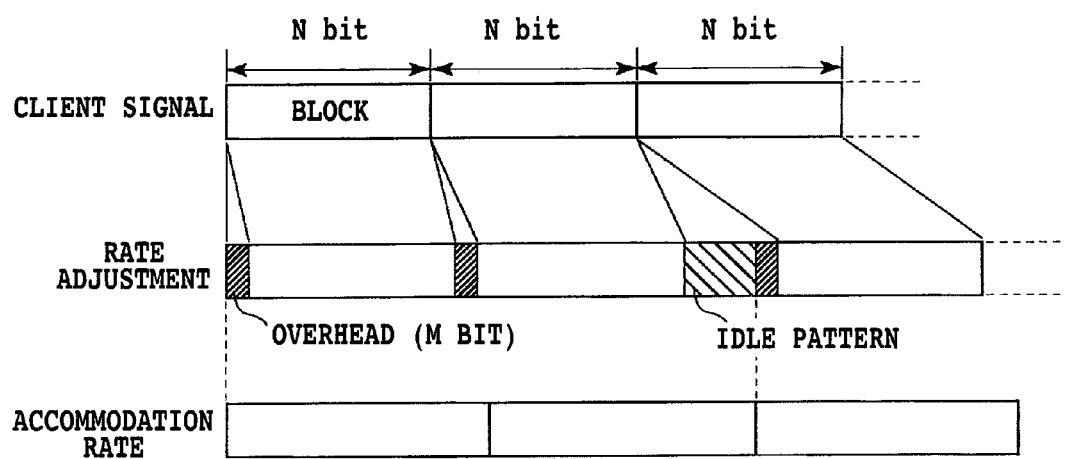
FIG. 2 is a view schematically showing a rate adjustment method for adjusting a client signal to an accommodation rate in the digital transmission system according to one embodiment of the invention.

FIG. 2 is a view schematically showing a rate adjustment method for adjusting a client signal to an accommodation rate in the rate adjusting unit 111 of the digital transmission system 100 according to one embodiment of the invention. Specifically, as will be described later, the rate adjusting unit 111 can accommodate, or accommodate and multiplex, various client signals by adjusting their bit rates to the same bit rate by employing any one of the methods of changing the frame structure, changing an idle pattern length, or changing the frequency of the idle pattern insertion according to the bit rate of the client signal, or by combining any of the methods. Here, in this description, the term "accommodation rate" refers to a predetermined bit rate at the time of transparent transmission in the digital transmission system 100, and a client signal that is adjusted to a predetermined bit rate so as to match this accommodation rate is transmitted.

Hereinafter, the description is given according to the flow of the rate adjustment. First, the rate adjusting unit 111 divides a bit string of the client signal received from the client device 102 via the client accommodating unit 110 into bit strings of predetermined N bits (N is a natural number). Next, the rate adjusting unit 111 handles a N-bit bit string as one block, and encapsulates the client signal by adding an overhead with a predetermined length (M bits, M is a non-negative integer) to that block. Thus, by this encapsulation process, the bit rate of the client signal increases to (M+N)/N times.

The rate adjusting unit 111 performs rate adjustment by adding an idle pattern as needed, in addition to this increasing of the bit rate. That is, the rate adjusting unit 111 enables rate adjustment in which the client signal encapsulated by adding an overhead thereto is matched to a predetermined bit rate indicated by an accommodation rate, by adjusting the frequency and position of the idle pattern insertion. The length of the idle pattern may be the same size as the encapsulated block (i.e., M+N bits), or may be different. It should be noted that the overhead shown in FIG. 2 is illustrated as being added before the block, for the sake of illustration, but the position at which the overhead is added may be both at the front and back of the block, or may be only at the back of the block.

Figure 12:
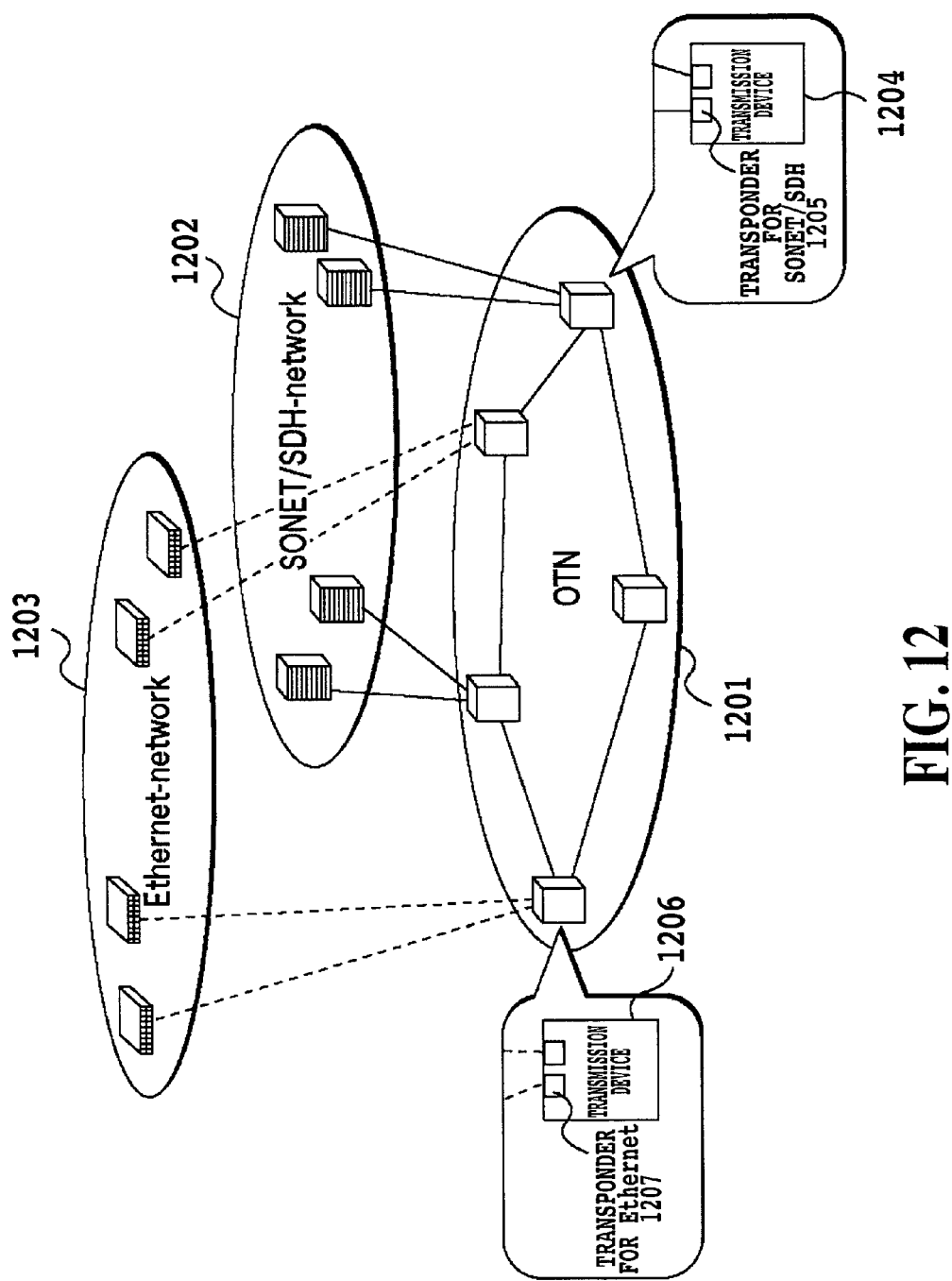
FIG. 12 is a configuration diagram showing one example of a conventional network configuration.
Figure 13:
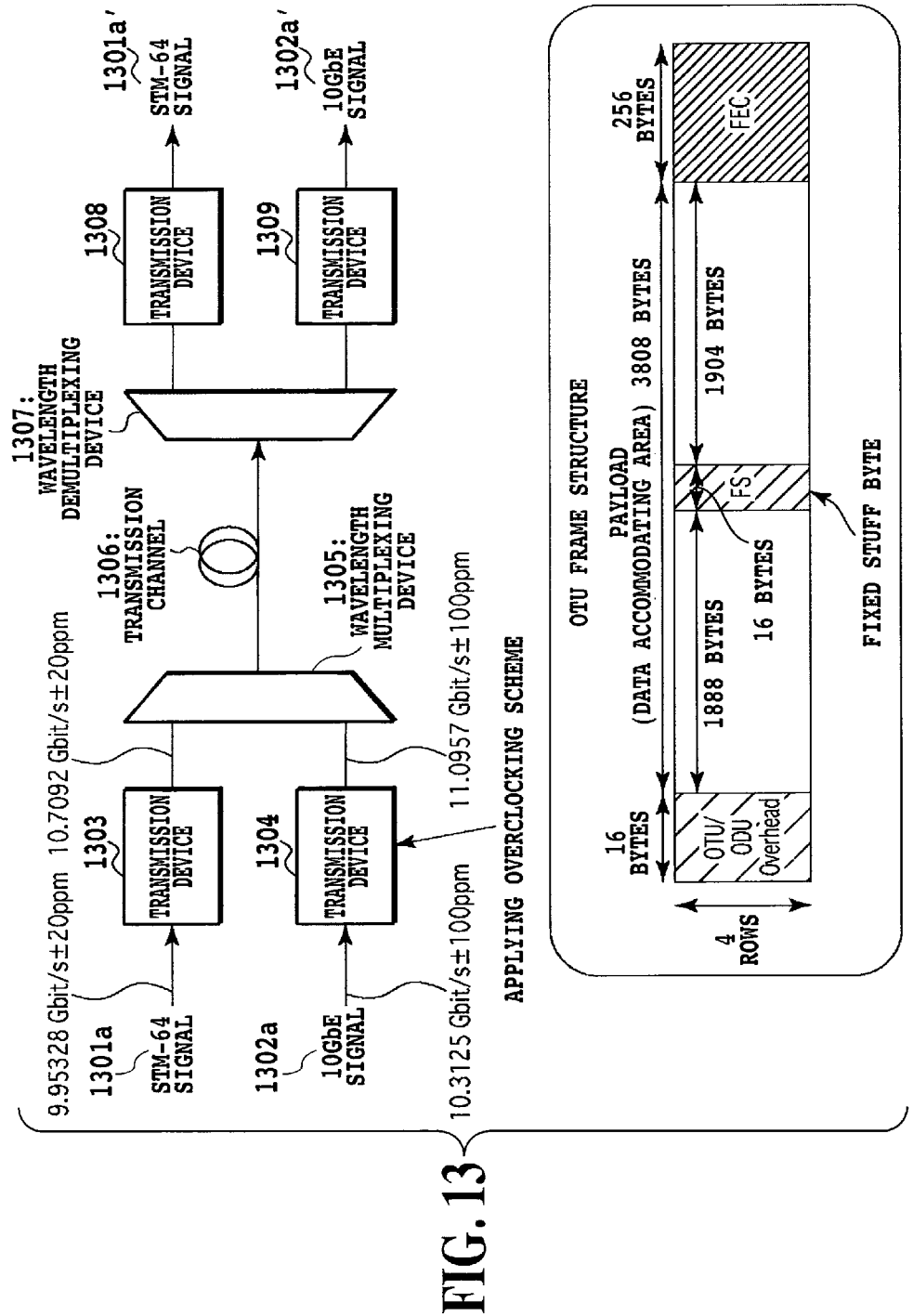
FIG. 13 shows a configuration diagram showing a digital transmission system, according to a conventional technique, in which a STM-64 signal and a 10 GbE LAN PHY signal are accommodated directly in a payload area of an OTU frame and transmitted by wavelength division multiplexing, and a configuration diagram of an OTU frame structure.

Furthermore, the network on the side in which the client signal is accommodated usually has a mechanism for absorbing a bit rate error. Therefore, the accuracy of the bit rate after the rate adjustment of the client signal need not be matched to a bit rate shown by the accommodation rate. The reason is as follows. For example, in the OTN 1201 shown by FIG. 12, the specified bit rate is permitted to have an error of ±20 ppm. Therefore, if the rate can be adjusted within that range, that is, within the range of ±20 ppm of the bit rate that the accommodation rate indicates, accommodating, or accommodating and multiplexing of the client signal becomes possible.

The method of realizing such a rate adjustment method as described above is shown in the ITU-T recommendation G.7041/Y.1303. However, the method specified in the recommendation is predicated on the 8B/10B encoding format client signal. In addition, the method is a scheme in which a 8B/10B code is decoded temporality and thereafter encoded to a 64B/65B code (i.e., a bit string with a bit rate that is $8/10 \times 65/64 = 13/16 = 0.8125$ times the bit rate of the original client signal), which is accommodated in a GFP frame (GFP-T: Transparent GFP). For this reason, the method is theoretically impossible to accommodate a transparent client signal at a bit level.

On the other hand, the invention may be characterized in that a client signal is accommodated directly in a payload portion, or accommodated in a payload portion after subjected to a reversible digital signal processing. Therefore, it is possible to accommodate the client signal transparently. As a result, with the transparent digital transmission, it becomes possible to use a user-specific client signal that is not specified by a standard.

In the foregoing rate adjustment method, the processing may be performed as necessary according to the bit rate of the client signal. For example, in the case that the client signal initially has a bit rate within a permissible range of the accommodation rate, the transmission device 101 may accommodate, or accommodate and multiplex, the client signal to the accommodation rate without performing the rate adjustment.

Figure 3A:
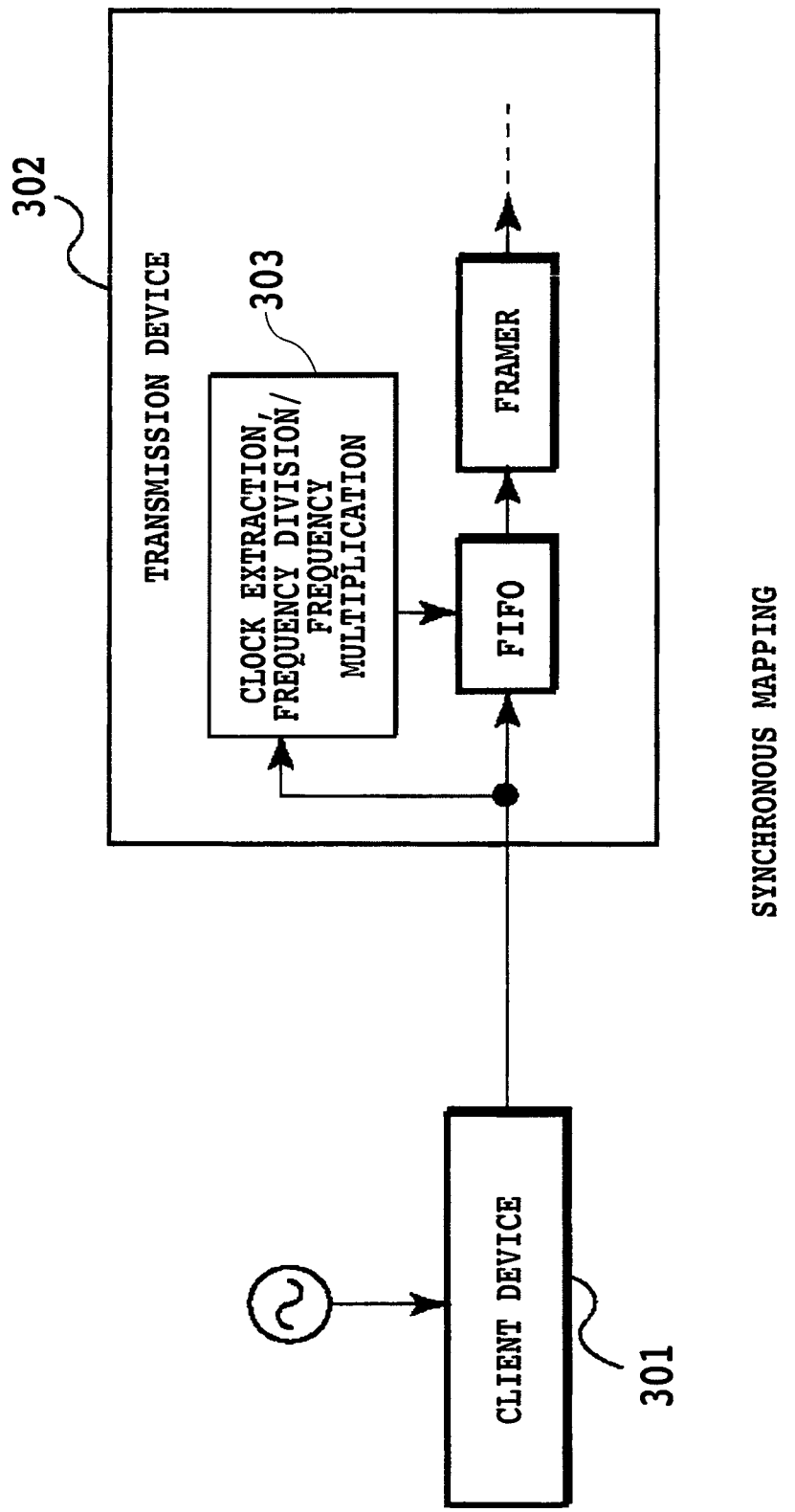
FIG. 3A is a view for illustrating that the rate adjustment according to one embodiment of the invention is adaptable to synchronous mapping.
Figure 3B:
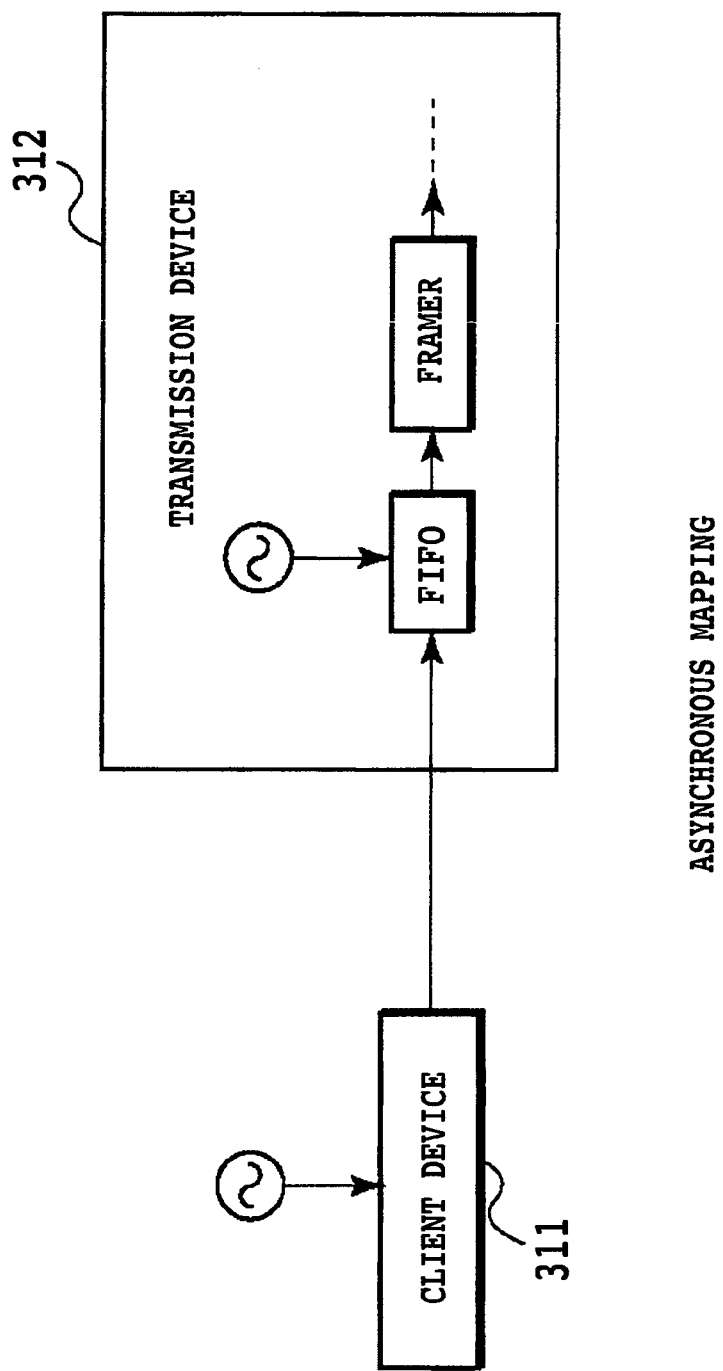
FIG. 3B is a view for illustrating that the rate adjustment according to one embodiment of the invention is adaptable to asynchronous mapping.

FIGS. 3A and 3B are views for illustrating that the rate adjustment according to one embodiment of the invention is adaptable to both synchronous mapping and asynchronous mapping. The synchronous mapping refers to a condition in which a client device 301 and a transmission device 302 are operating at a synchronized clock. The asynchronous mapping refers to a condition in which the client device 311 and the transmission device 312 are operating at different clocks. Thus, the transmission device 302 that performs the synchronous mapping is provided with a device 303 for performing synchronous mapping by extracting and frequency-demultiplexing/frequency-multiplying the clock of the client signal received from the client device 301.

The rate adjustment method that uses only a fixed frame without using an idle pattern as shown in FIG. 2 needs to increase the clock at a constant rate, so it is only applicable to the synchronous mapping. In contrast, the rate adjustment method according to one embodiment of the invention can use the idle pattern in addition to the rate adjustment by the encapsulation using a frame structure, so it is applicable to both the synchronous mapping and the asynchronous mapping.

Figure 4:
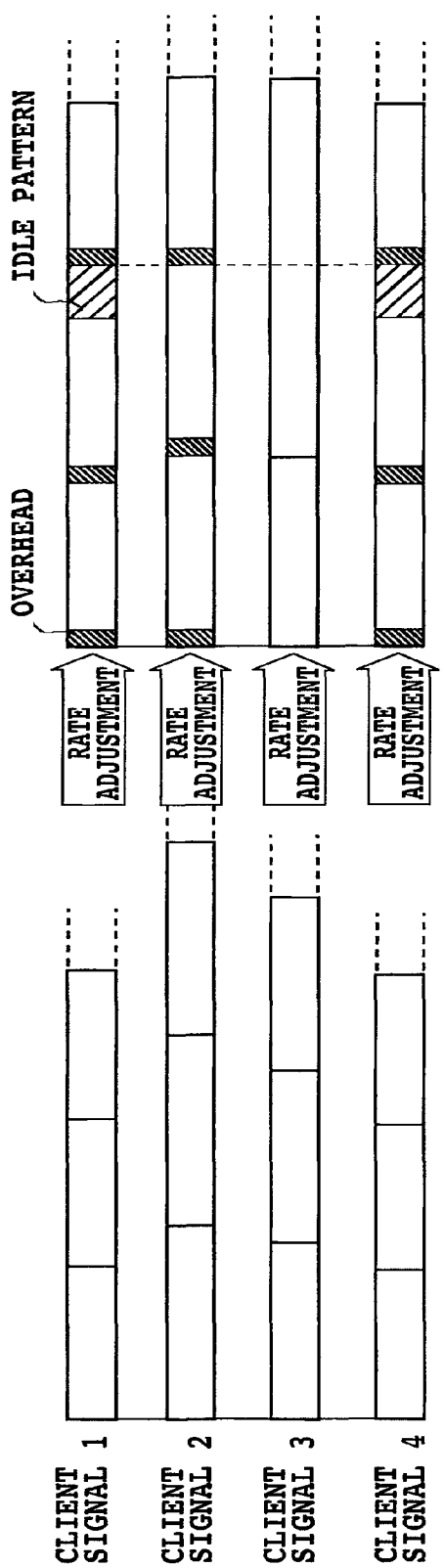
FIG. 4 is a view showing a rate adjustment method in a digital transmission system according to one embodiment of the invention.

FIG. 4 is a view schematically showing a method for the rate adjustment for accommodating, or accommodating and multiplexing, a plurality of different types of client signals 1 to 4 in the digital transmission system according to one embodiment of the invention.

The rate adjusting unit 111 can adjust and multiplex a plurality of client signals of different types to a predetermined bit rate indicated by the accommodation rate by employing one of the methods of changing the frame structure, changing the idle pattern length, and changing the frequency of the idle pattern insertion according to the bit rate of the client signal, or by combining any of the methods. That is, as described above, the rate adjusting unit 111 performs such rate adjustment that an overhead is added to the client signal to encapsulate the signal according to the bit rate of each client signal and an idle pattern is added thereto so that the client signal is adjusted to a predetermined bit rate indicated by the accommodation rate.

As described above, the network in which the client signal is to be accommodated can usually absorb the bit rate error. Therefore, a plurality of client signals need not be adjusted to the completely identical bit rate to the predetermined bit rate indicated by the accommodation rate, and may be adjusted to be a bit rate within a permissible range. In addition, if some of the plurality of client signals originally have a bit rate that is within the permissible range of the accommodation rate, such client signals may be accommodated and multiplexed without being subjected to the rate adjustment.

Figure 5:
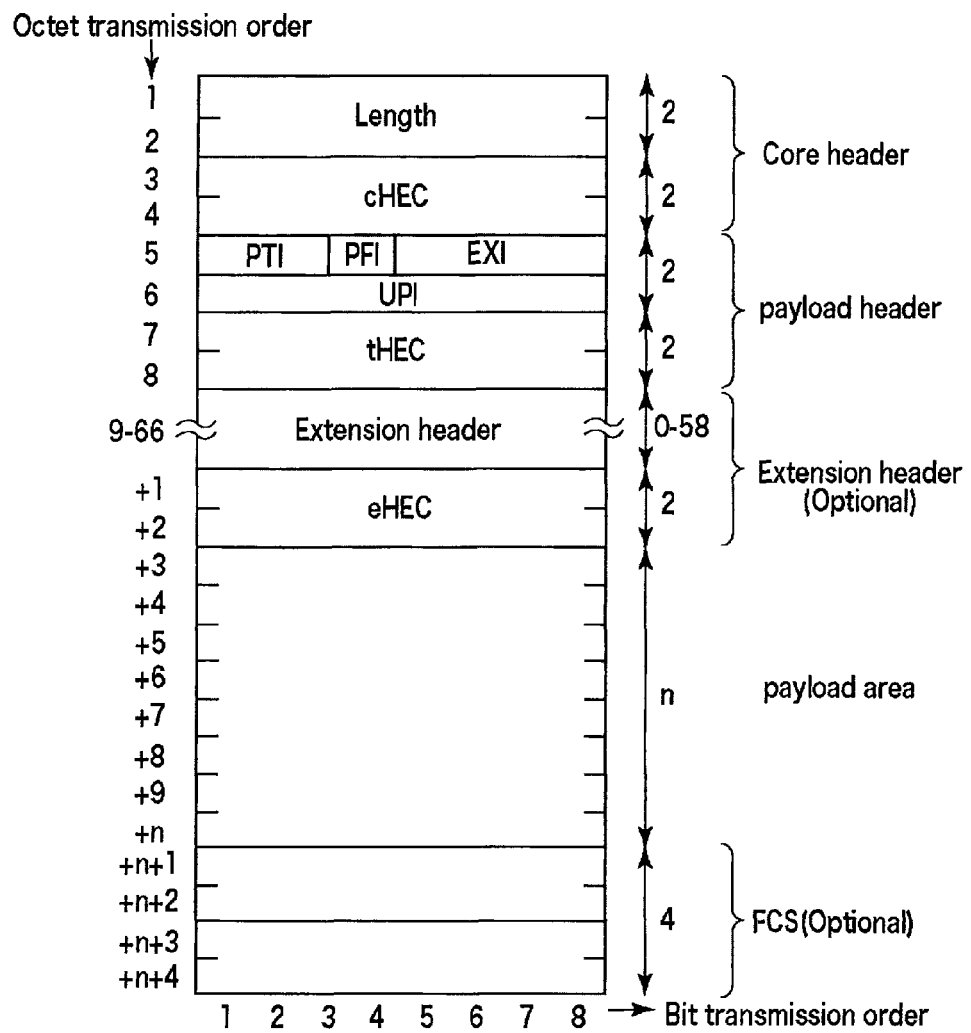
FIG. 5 is a view showing a GFP frame structure adaptable to a digital transmission system according to one embodiment of the invention.

FIG. 5 is a view showing a GFP frame structure having a fixed length overhead and a payload. The GFP frame has a 4 byte core header, a 4 byte payload header, a 0-60 byte extension header (optional), an n byte payload area, and a 4 byte frame check sequence (FCS, optional).

The GFP frame is applicable to the digital transmission system according to one embodiment of the invention. It should be noted that although the GFP-T scheme is specified in the GFP as a method that uses a fixed length frame structure, that scheme is different from the invention in that, as described above, the scheme is predicated on the 8B/10B encoding format signal and it is incapable of transparent transmission.

The digital transmission system according to one embodiment of the invention can perform one of alarm transferring and performance monitoring, or both alarm transferring and performance monitoring, by utilizing the extension header of the GFP frame shown in FIG. 5. In the following, the alarm transferring and the performance monitoring will be described.

The alarm transferring becomes possible by detecting an alarm signal specified in the OTN, such as MS-AIS, Generic-AIS, and shutdown, and accommodating a specific bit pattern according to the abnormal condition indicated by the detected alarm signal into an area that is provided in the extension header in advance. More specifically, when detecting an alarm signal that indicates abnormality of the client signal received from the client accommodating unit 110, the rate adjusting unit 111 inserts a specific bit pattern according to the abnormal condition indicated by the alarm signal into the header area of the GFP to inform the transmission device 121 of the abnormal condition. In addition, it is possible to perform alarm transferring also in the rate adjusting unit 131 of the transmission device 121 on the receiver side. Specifically, when receiving the signal that has undergone the rate adjustment from the framer processing unit 132, the rate adjusting unit 131 detects an alarm signal from the foregoing signal and informs the client accommodating unit 130 of the abnormal condition.

The performance monitoring is performed between the rate adjusting unit 111 and the rate adjusting unit 131. Specifically, the rate adjusting unit 111 accommodates a predetermined bit pattern in a predetermined area provided in the extension header portion. The rate adjusting unit 131 estimates the bit error rate by counting the bit error in that area. Thereby, the performance monitoring of the client signal that has undergone the rate adjustment in the rate adjusting unit 111 is performed.

Figure 6A:
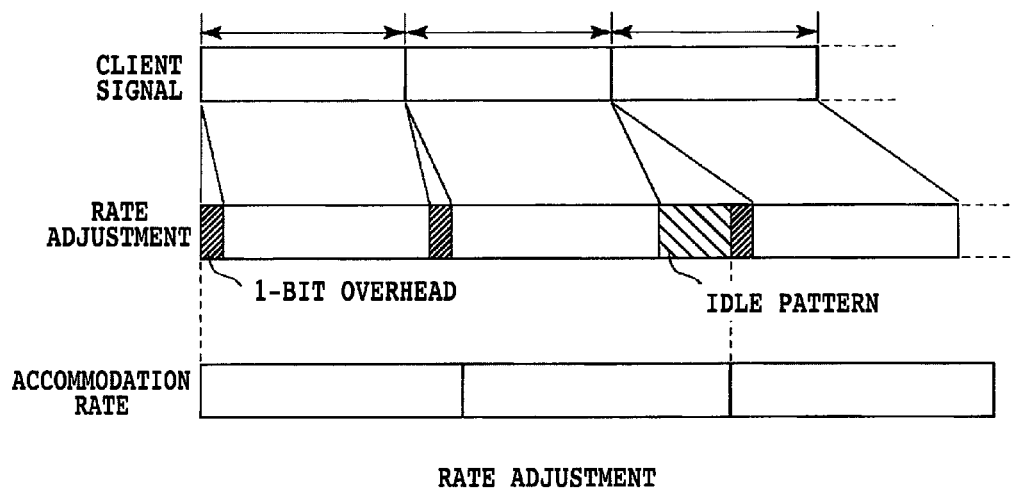
FIG. 6A is a view schematically showing a scheme in which the overhead portion of a frame structure having a fixed length overhead and a pay load is a 1-bit overhead.

FIG. 6A is a view schematically showing a scheme in which the overhead portion of the frame structure having a fixed length overhead and a pay load is a 1-bit overhead. An example of the application of the scheme is 64B/65B encoding, that is, a scheme in which a 1 bit overhead is added to each 64 bits of client signal and a resulting 65 bit signal is transmitted.

Figure 6B:
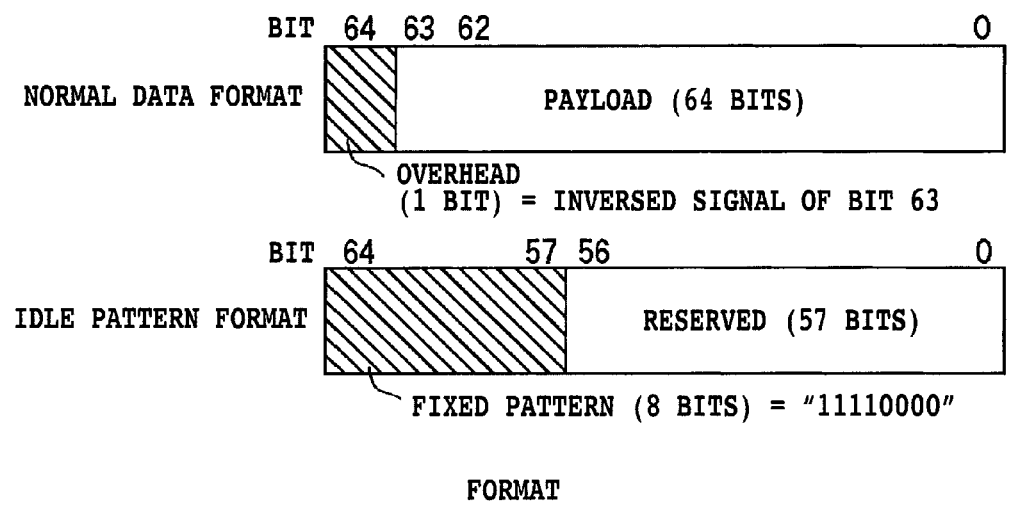
FIG. 6B is a view showing one example of a normal data format and an idle pattern format.

FIG. 6B is a view showing one example of a normal data format and an idle pattern format. The example of the normal data format shows a scheme in which an inversed bit of bit 63 in the blocked client signal is added as the overhead. This setting enables the side that receives the client signal transmitted from the transmission device 101 to establish frame synchronization by detecting any of "01", "10", or the idle pattern continuously. A possible example of the idle pattern format is a format comprising a 8 bit fixed pattern and a 57 bit reserved area. In this example, it is possible to estimate the bit error rate on the receiver side by counting the error of the overhead portion.

It should be noted that although 64B/65B encoding was taken as an example in the above description, it is possible to use 32B/33B encoding or the like as the example shown in FIG. 6A.

Figure 7:
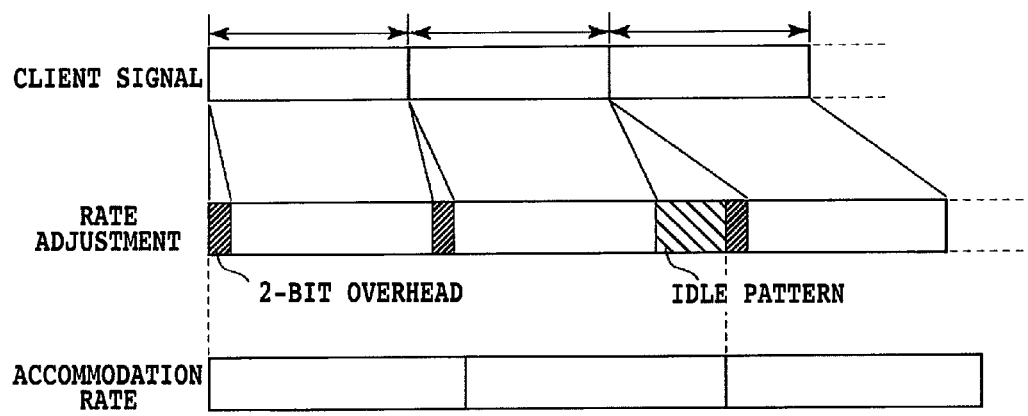
FIG. 7 is a view schematically showing a scheme in which the overhead portion of a frame structure having a fixed length overhead and a pay load is a 2-bit overhead.

FIG. 7 is a view schematically showing a scheme in which the overhead portion of the frame structure having a fixed length overhead and a pay load is a 2-bit overhead. An example of the application of the scheme is 64B/66B encoding, that is, a scheme in which a 2 bit overhead is added to each 64 bits of client signal and a resulting 66 bit signal is transmitted. Such a frame structure is used in 10 GbE LAN PHY, so it is possible to use that scheme. It is also possible to estimate the bit error rate on the side that receives the client signal transmitted from the transmission device 101 by counting the error of the overhead portion.

Figure 8:
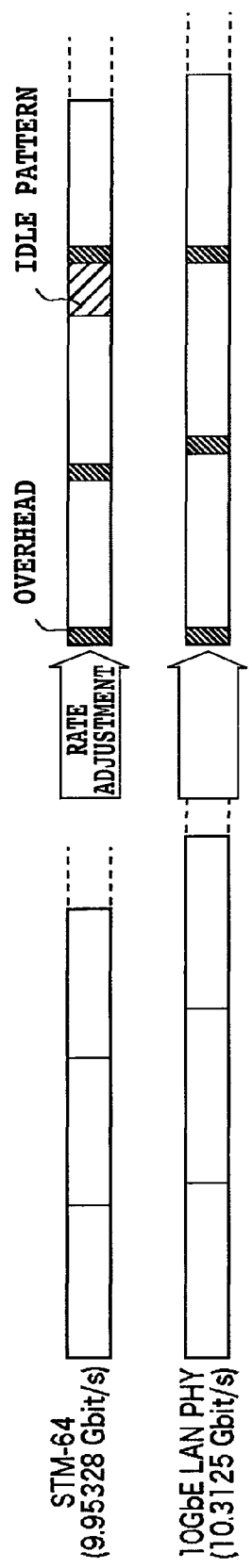
FIG. 8 is a view showing an example in which a STM-64 signal and a 10 GbE LAN PHY signal, as different types of client signals, are subjected to the rate adjustment and accommodated in the transmission system according to one embodiment of the invention.

FIG. 8 is a view showing a case in which a STM-64 signal and a 10 GbE LAN PHY signal are rate-adjusted and accommodated as different types of client signals in the digital transmission system according to one embodiment of the invention.

The bit rates of the client signals are as follows: the STM-64 is 9.95328 Gbit/s±20 ppm, and the 10 GbE LAN PHY is 10.3125 Gbit/s±100 ppm. Accordingly, when the accommodation rate is set at 10.3125 Gbit/s, the rate adjusting unit should adjust the STM-64 client signal to be 10.3125 Gbit/s±100 ppm according to the above-described rate adjustment method and output the 10 GbE LAN PHY client signal as it is without subjecting to the rate adjustment. Thus, both the client signals can be adjusted to a desired accommodation rate.

Figure 9A:
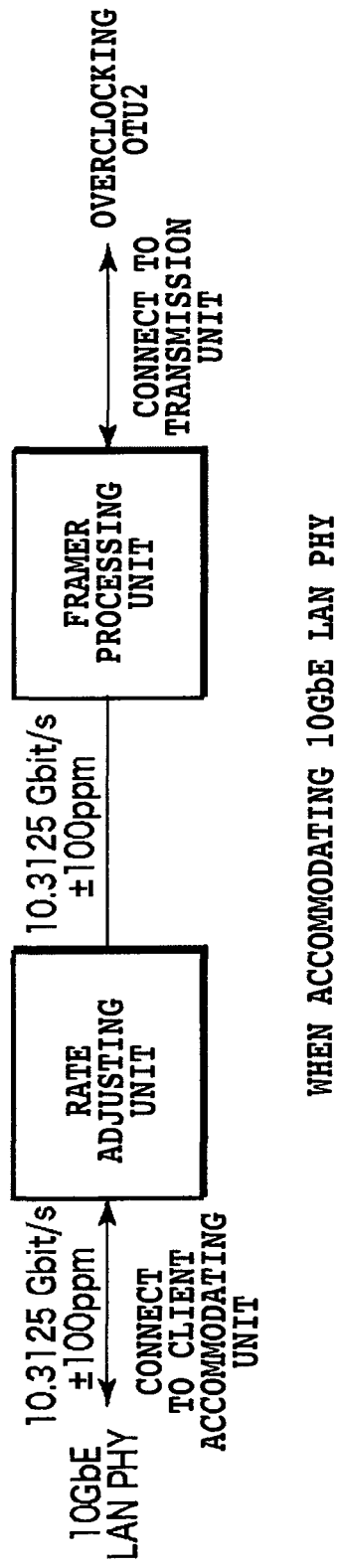
FIG. 9A is a view showing an example in which 10 GbE LAN PHY signal is accommodated in the digital transmission system according to one embodiment of the invention.
Figure 9B:
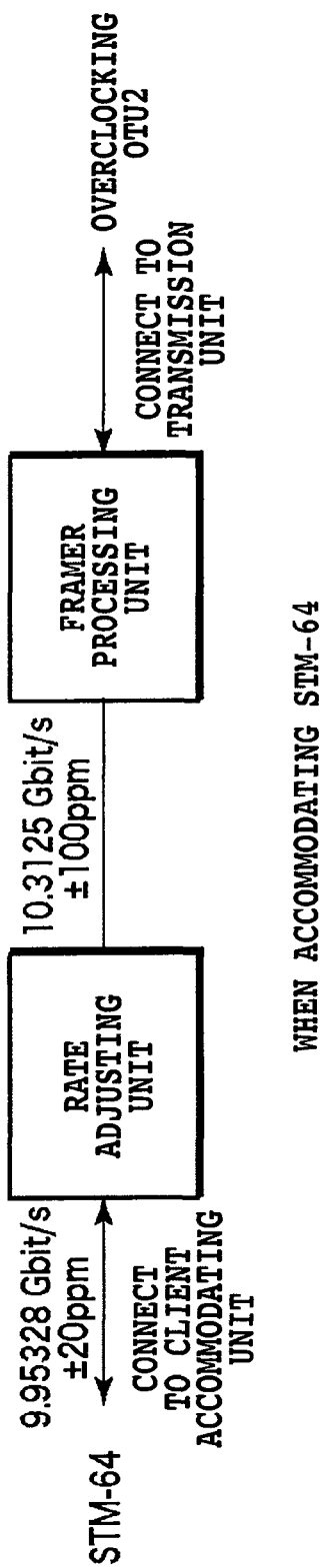
FIG. 9B is a view showing an example in which STM-64 signal is accommodated in the digital transmission system according to one embodiment of the invention.
Figure 10:
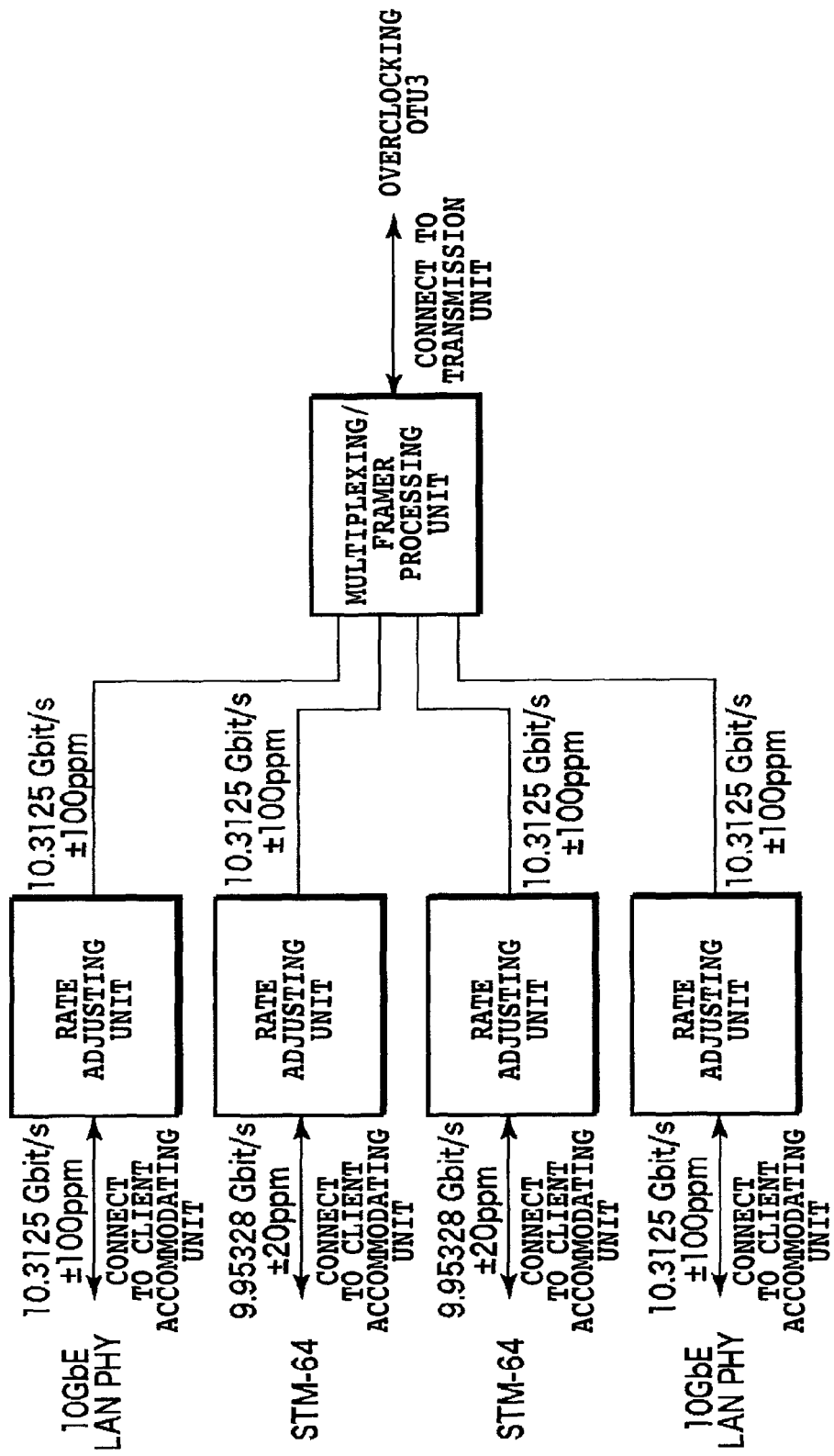
FIG. 10 is a view showing an example in which a client signal is accommodated in the digital transmission system according to one embodiment of the invention.

After the client signals have been adjusted to the desired accommodation rates, the rate-adjusted client signal can be accommodated in an OTU frame by the framer processing unit 112 and transmitted by an overclocked OTU2, as shown in FIGS. 9A and 9B. Alternatively, as shown in FIG. 10, after accommodating the STM-64 signal and the 10 GbE LAN PHY signals in an OTU frame, the four different types of client signals may be multiplexed by a multiplex/framer processing unit and thereafter transmitted by an overclocked OTU3. It should be noted that in the OTN, OTU frames having different bit rates, namely, OTU1, OTU2, and OTU3, are standardized as the optical channel transport unit (OTU).

Figure 11:
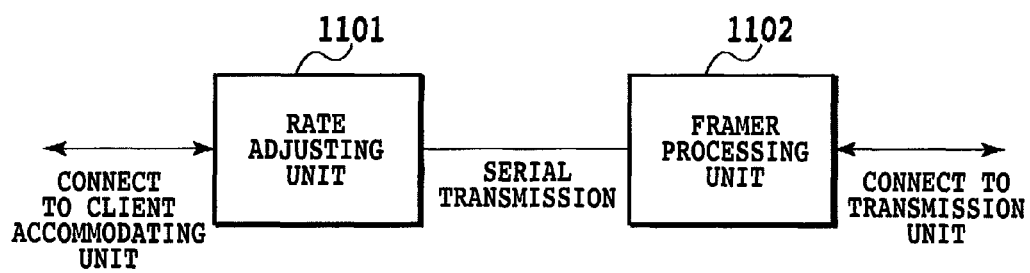
FIG. 11 is a view showing the configurations of a rate adjusting unit and a framer processing unit in the digital transmission system according to one embodiment of the invention.

FIG. 11 is a view showing the configurations of a rate adjusting unit 1101 and a framer processing unit 1102 according to one embodiment of the invention. The rate adjusting unit 1101 for adjusting the rate of client signal and the framer processing unit 1102 for accommodating the rate-adjusted client signal in an OTU frame or the like are connected by a serial transmission scheme.

In such a configuration, in the case where the frequencies of appearance of 0 and 1 are unbalanced or in the case where either 0 or 1 keeps appearing long, it is possible to make the frequencies of appearance of 0 and 1 to be equal, or to increase the frequency of the inversion from 0 to 1 or the inversion from 1 to 0, by performing scramble processing prior to the rate adjustment for the client signal in the rate adjusting unit 1101.

Since the scramble processing is a reversible process, so the process does not degrade the transparency of the client signal. In addition, the process makes it possible to obtain advantages such that the extraction of clocks by the framer processing unit 1102 becomes easy.

Figure 14:
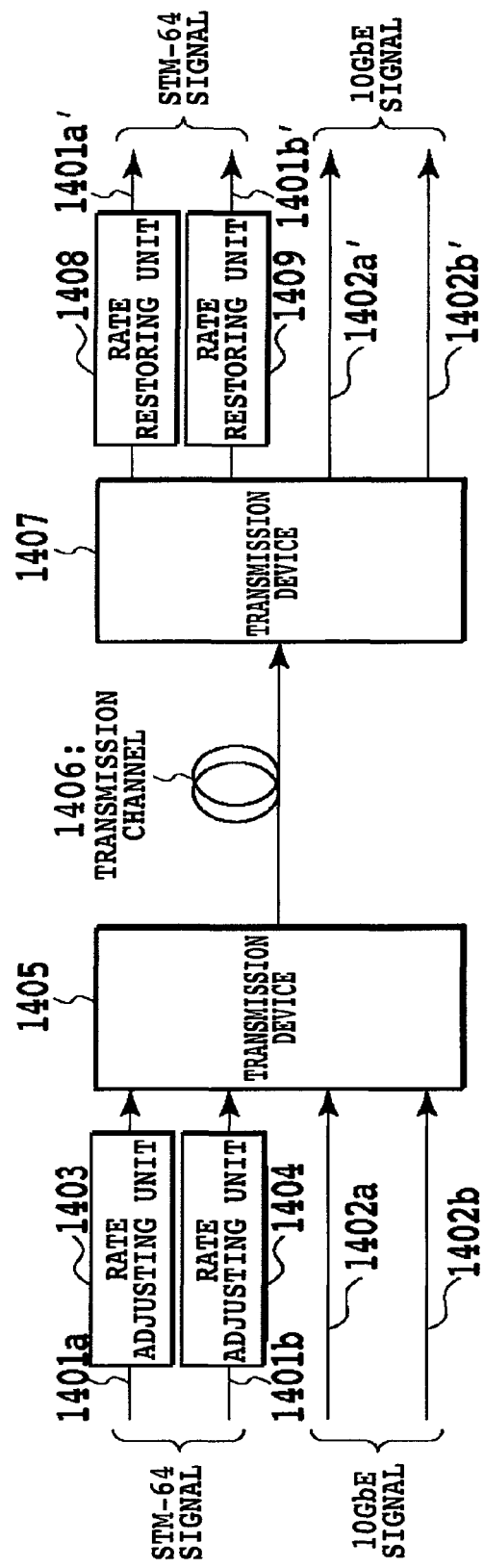
FIG. 14 is a view showing a basic block configuration of a digital transmission system, according to one embodiment of the invention, in which a plurality of types of client signals having different bit rates are multiplexed and transmitted.

FIG. 14 is a view showing a basic block configuration of a digital transmission system, according to one embodiment of the invention, in which a plurality of types of client signals having different bit rates are multiplexed and transmitted. The client signals are two STM-64 signals 1401*a* and 1401*b*, and two 10 GbE LAN PHY signals 1402*a* and 1402*b*. The STM-64 signals 1401*a*, 1401*b* are transparently rate-adjusted to a vicinity of a bit rate of 10.3125 Gbit/s, which is the bit rate of the 10 GbE LAN PHY signal, using a fixed frame in which a dummy pattern is inserted in the rate adjusting units 1403 and 1404, which are the circuits for performing the rate adjustment. This rate adjustment for the STM-64 signal will be described later with reference to FIG. 16.

The rate-adjusted STM-64 signals 1401*a*, 1401*b* and the 10 GbE LAN PHY signals 1402*a*, 1402*b* are multiplexed in a transmitter side transmission device 1405 and transmitted to a receiver side through a transmission channel 1406. The rate-adjusted STM-64 signals and the 10 GbE LAN PHY signal are separated from the reception signal in a receiver side transmission device 1407, and are output therefrom. For the rate-adjusted STM-64 signals, the dummy pattern is deleted from the fixed frame and the original bit rate of the client signals is restored in rate restoring units 1408 and 1409, which are the circuits for restoring the bit rate of the client signal that has undergone the rate adjustment, and thereafter the signals are output (1401*a*' and 1401*b*'). The transmission device 1405 adopts an overclocking scheme because it accommodates 10.3125 Gbit/s 10 GbE LAN PHY signals, so the bit rate of the OTN signal in which the client signal has been multiplexed by 4 times is 44.6 Gbit/s.

In order to accommodate or multiplex a plurality of types of client signals having different bit rates to a digital frame for transmission with one bit rate, the bit rates of the client signals are increased to a vicinity of the highest bit rate among those of the client signals using a specific fixed frame. Usually, the bit rate of the client accommodation area of the digital frame for transmission is permitted to be within a certain range. For example, a bit rate error within a range of ±20 ppm is permitted in the specification of the OTN system. This may be specified by a certain range of the bit rate of the digital frame, or may be permitted by the frequency synchronization function of the justification process of the digital frame or the like. Therefore, the rate adjustment for a plurality of types of client signals having different bit rates does not need to match the bit rates completely, but the rate conversion may be performed so that the bit rates may be within a permissible range by the digital frame. In this case, in order to ensure the transparency of the client signals, the bit sequence of the client signals is not subjected to any processing, and the rates are adjusted by, for example, adding a new overhead.

In the international standard OTN, frequency deviation up to ±65 ppm can be absorbed by a justification process, maximum. However, the frequency accuracy of the 10 GbE LAN PHY signal is ±100 ppm. Therefore, in this embodiment, the number of bytes per one OTU frame is increased from 1 byte to 2 bytes for a byte area for the justification process (that is, OPU), so that the frequency adjustment range can be enlarged.

Figure 15:
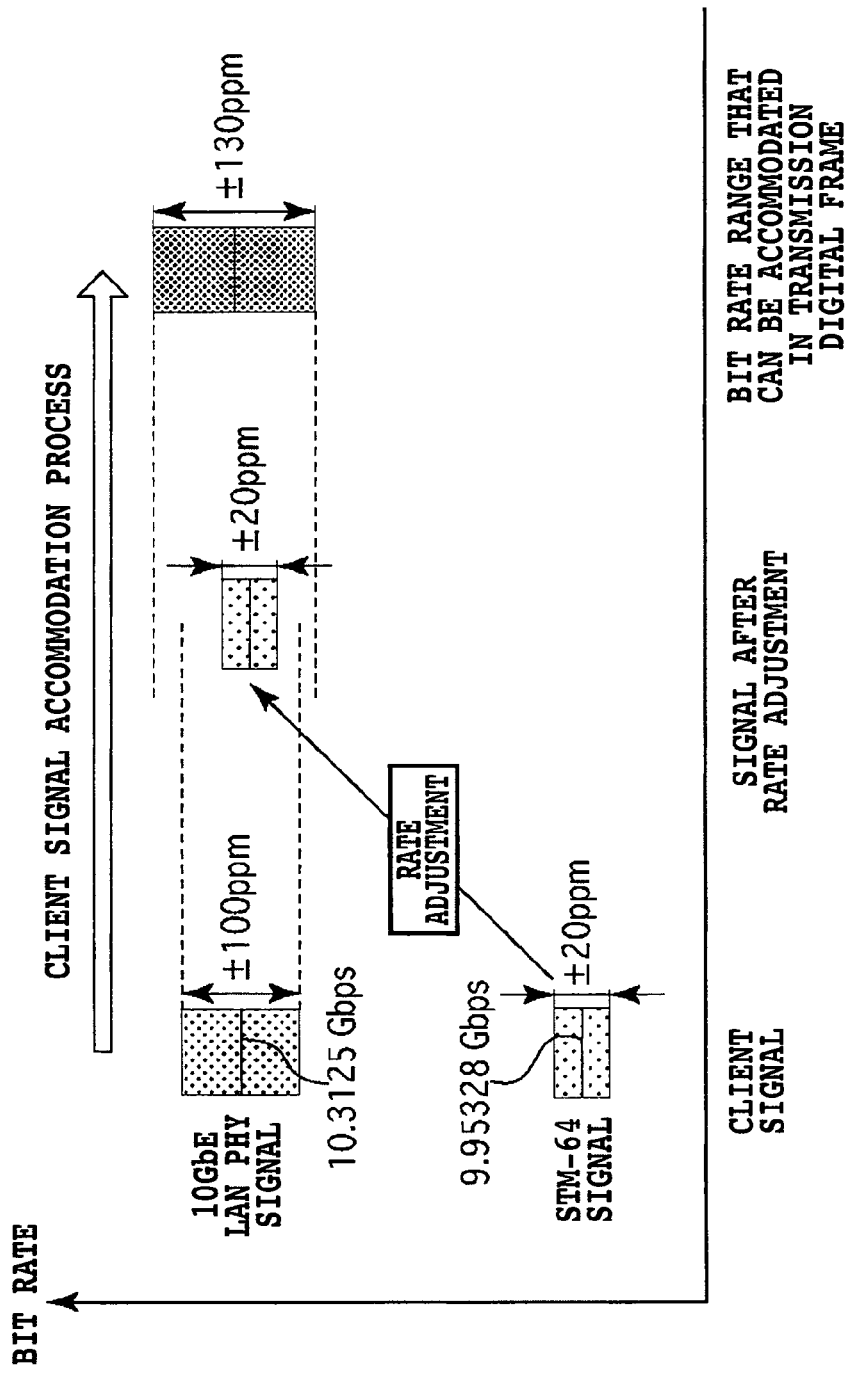
FIG. 15 is a view showing one example of the process in which a bit rate is being converted in a process of accommodating a client signal.

FIG. 15 is a view showing an example of the process in which a bit rate is being converted in the process for accommodating a client signal. The bit rates of the client signals, the STM-64 signal and the 10 GbE LAN PHY signal, are 9.95328 Gbit/s±20 ppm and 10.3125 Gbit/s±100 ppm, respectively. The 10 GbE LAN PHY signal is accommodated in the digital frame as it is, without being subjected to any processing. The bit rate of the STM-64 signal is increased to be within a range of 10.3125 Gbit/s±100 ppm using a fixed frame so that the bit rate can fall within a bit rate range with which it can be accommodated in the digital frame, and the STM-64 signal is accommodated in the digital frame. Here, since the transmission device accommodates the 10 GbE LAN PHY signal, the justification process function is extended so that it can permit a bit rate deviation of ±100 ppm. This can also be achieved by enhancing the frequency adjustment range of the justification function by, for example, enlarging the range of byte for justification of the OTU frame, as described above, to accommodate the 10 GbE LAN PHY signal with a frequency accuracy of ±100 ppm. In this embodiment, a frequency deviation of ±65 ppm×2=±130 ppm can be permitted since the number of bytes per one OTU frame is increased from 1 byte to 2 bytes, as shown in FIG. 15. Using this justification function, the 10 GbE LAN PHY signal and the rate-adjusted STM-64 signal are synchronized in frequency and accommodated. This allows frequency synchronization between a plurality of client signals, so time-division multiplexing to a further faster OTU frame also becomes possible.

FIG. 16 is a view showing an example of the configuration of a fixed frame for the rate adjustment for a STM-64 signal. Here, an M bit dummy pattern 1602*a* is inserted to every N bits 1602*b* of a STM-64 signal 1601 before the rate adjustment (N and M here are natural numbers), and a fixed frame is constituted by a set of a dummy pattern M bits and a client signal N bits. Here, using the bit rate 9.95328 Gbit/s of the STM-64 signal 1601 and the frequency accuracy ±20 ppm, the values of M and N need to be set so that the value (9.95328±20 ppm)×(M+N)/N falls within a bit rate range that can be accommodated in a digital frame for transmission. The bit rates of a STM-64 signal 1602 in which the dummy pattern 1602*a* is inserted for the rate adjustment and a 10 GbE LAN PHY signal 1603 are adjusted to be within a range that can be accommodated in a digital frame for transmission, and thereafter the STM-64 signal 1602 and the 10 GbE LAN PHY signal 1603 are accommodated or multiplexed. In this description, the rate M/N, which indicates that a M bit dummy pattern is inserted at every N bits of the STM-64 signal, is referred to as a dummy pattern insertion rate.

In the OTN standardized by ITU-T, the frequency accuracy of the client signal is ±20 ppm, but the frequency accuracy of the 10 GbE LAN PHY signal is ±100 ppm. To map the client signal of the 10 GbE LAN PHY signal to an OTU frame with an allowance of frequency accuracy of ±100 ppm, there is a method in which the bit rate of the OTU frame is permitted up to ±100 ppm. Accordingly, taking the frequency accuracy of STM-64 signal ±20 ppm and the frequency accuracy of 10 GbE LAN PHY signal ±100 ppm into consideration, the dummy pattern insertion rate M/N needs to be set within a range from (9.95328−20 ppm)/((10.3125+100 ppm)−(9.95328−20 ppm)) to (9.95328+20 ppm)/((10.3125−100 ppm)−(9.95328+20 ppm)) so that it can be within a bit rate range that can be accommodated in a digital frame.

As shown in a lower portion of FIG. 16, the M bit dummy pattern 1602*a* contains a frame synchronization pattern 1604a. In order to separate the client signal from the fixed frame and output the signal after restoring the rate at the receiver side, it is necessary to discriminate the position of the dummy pattern. Therefore, the rate adjusting units 1403 and 1404 set the frame synchronization pattern 1604a in the dummy pattern. The rate restoring units 1408 and 1409 determine whether or not the frame synchronization pattern 1604a appears at a fixed frame cycle to discriminate the dummy pattern insertion position. Then, the dummy pattern 1602a is deleted. Usually, a signal of a digital communication system contains a frame synchronization pattern for performing frame synchronization, and this also applies to the client signal. In order to avoid misdetection of a dummy pattern because of the frame synchronization pattern used in the client signal, a frame synchronization pattern different from used in the client signal is used as the frame synchronization pattern for discriminating a dummy pattern insertion position. For example, in this embodiment, the frame synchronization pattern for discriminating a dummy pattern insertion position may be, but is not limited to, an inverted pattern of F628.

In addition, identical code continuation can be avoided by setting the area in the dummy pattern 1602a other than the frame synchronization pattern 1604a to be a scramble pattern 1604b. In the case that a serial data signal connection or an optical signal connection is used as the interface between the circuit for performing the rate adjustment (i.e., the rate adjustment unit) and the circuit for performing digital frame processing for transmission (i.e., the transmitter side transmission device), clock extraction is conducted at the receiver side, and the subsequent digital processing is performed with the extracted clock. In this case, the clock extraction becomes impossible if identical code continuation occurs. As illustrated in this embodiment, by containing the scramble pattern 1604b in the dummy pattern 1602a, identical code continuation can be avoided, and the requirement for identical code continuation resistance by the timing extraction circuit can be alleviated.

Examples of the dummy pattern insertion rate are shown in the following Table 1. Rate conversion of a 9.95328 Gbit/s signal to a 10.3125 Gbit/s signal is not realistic, because it requires an extremely large least common multiple and the rate adjustment needs to be conducted using an extremely long frame. However, by utilizing the frequency adjusting function provided for the digital frame for transmission (OTU frame of OTN in this embodiment), it becomes possible to accommodate or multiplex a plurality of types of client signals having different bit rates in a digital frame having the same bit rate, without matching the bit rates of the client signals having different bit rates completely. This embodiment shows an example in which four client signals are time-division multiplexed and transmitted as a 44.6 Gbit/s OTN signal, but it is possible that the four signals may be wavelength division multiplexed and transmitted without being subjected to time-division multiplexing. In this case, the transmission bit rates of the transmission devices can be made equal for various wavelengths, so the costs of the optical transmission-reception module and the frame processing circuit can be reduced. In addition, this embodiment shows that the rate adjusting units are provided outside the transmission device, but it is possible that the rate adjusting units may be provided between a client accommodating unit (not shown) and a frame processing unit (not shown) in the transmission device.

TABLE 1

Examples of dummy pattern insertion rate

| STM-64 signal (N) | Dummy pattern (M) | After rate adjustment (N + M) | Bit rate after rate adjustment [Gbit/s] | Error [ppm] |
| --- | --- | --- | --- | --- |
| 194 | 7 | 201 | 10.31241897 | 7.8575 |
| 388 | 14 | 402 | 10.31241897 | 7.8575 |
| 471 | 17 | 488 | 10.3125279 | -2.7053 |
| 582 | 21 | 603 | 10.31241897 | 7.8575 |
| 665 | 24 | 689 | 10.31249612 | 0.3762 |
| 748 | 27 | 775 | 10.31255615 | -5.4448 |
| 776 | 28 | 804 | 10.31241897 | 7.8575 |
| 859 | 31 | 890 | 10.3124787 | 2.0658 |
| 942 | 34 | 976 | 10.3125279 | -2.7053 |
| 3677 | 133 | 3810 | 10.31329801 | 77.383 |
| 3675 | 133 | 3808 | 10.31349394 | 96.382 |

Figure 17A:
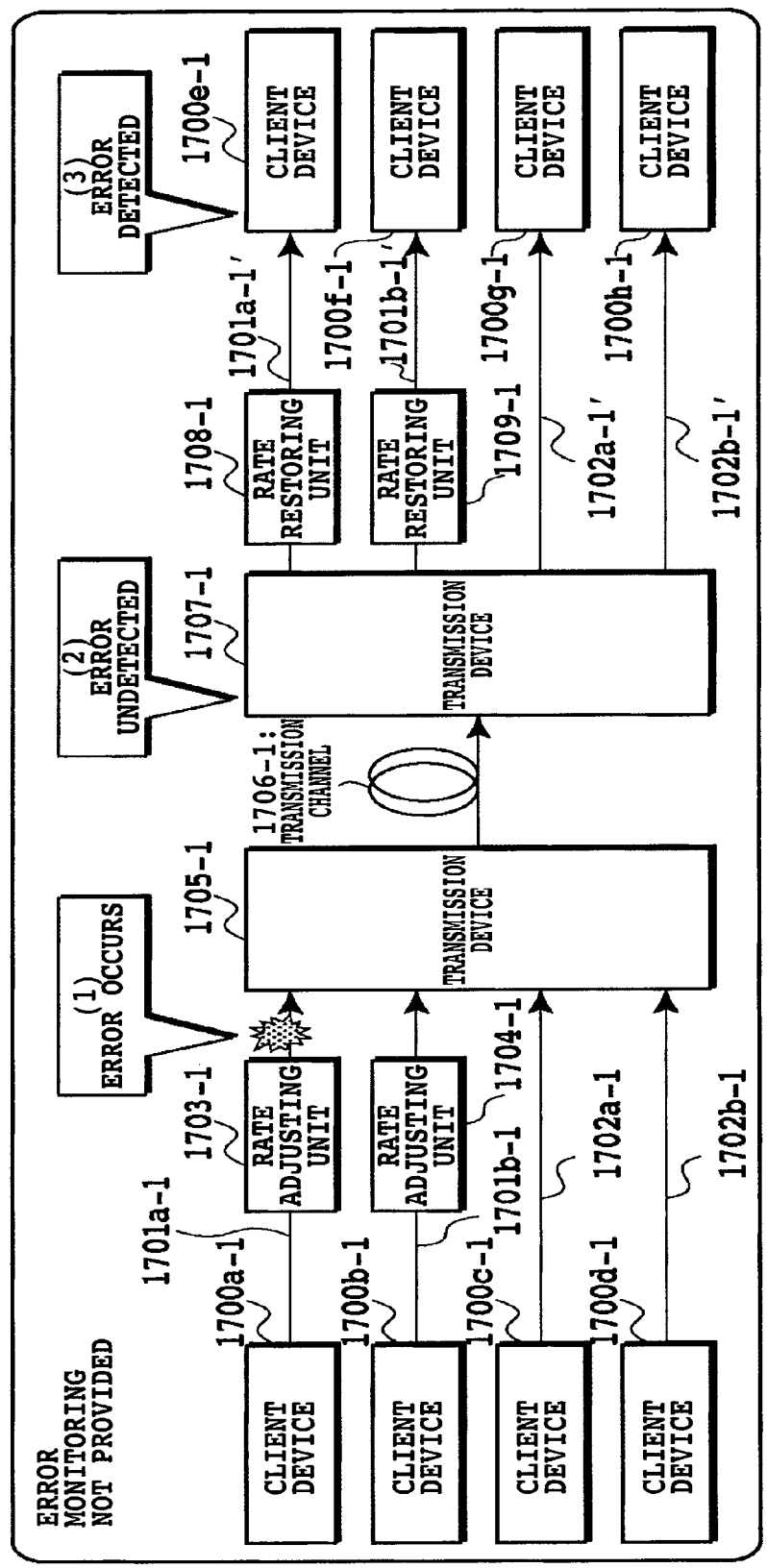
FIG. 17A is a view showing a basic block configuration of a digital transmission system in which a plurality of types of client signals having different bit rates are multiplexed and transmitted, in the case that error monitoring is not provided.
Figure 17B:
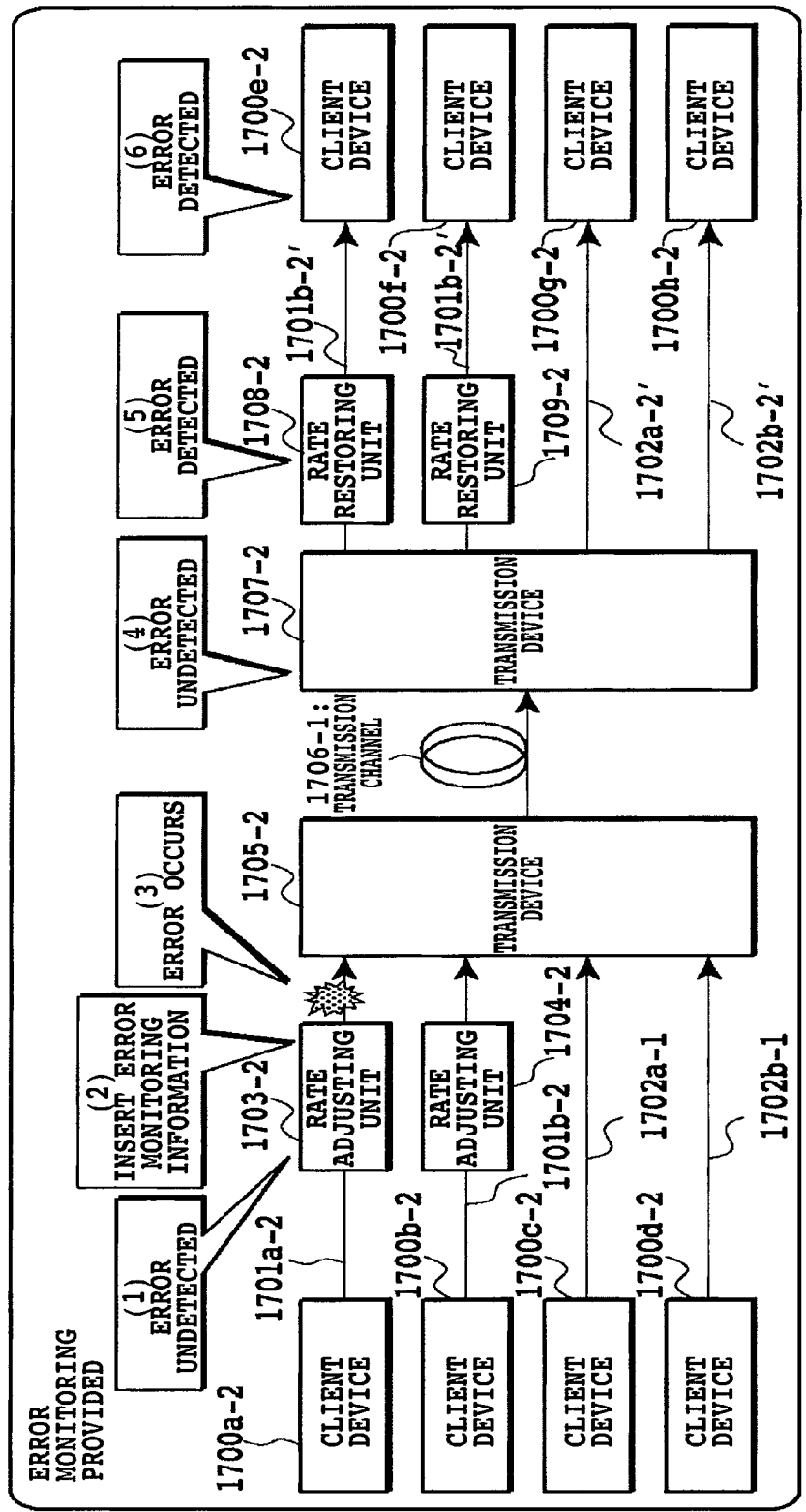
FIG. 17B is a view showing a basic block configuration of a digital transmission system, according to one embodiment of the invention, in which a plurality of types of client signals having different bit rates are multiplexed and transmitted, in the case that error monitoring is provided.

FIG. 17A is a view showing a basic block configuration of a digital transmission system in which a plurality of types of client signals having different bit rates are multiplexed and transmitted, in the case that error monitoring is not provided. FIG. 17B is a view showing a basic block configuration of a digital transmission system, according to one embodiment of the invention, in which a plurality of types of client signals having different bit rates are multiplexed and transmitted, in the case that error monitoring is provided. In the embodiment shown in FIG. 17B, rate adjusting units 1703-2 and 1704-2 perform the rate adjustment executed by the rate adjusting units 1403 and 1404 in the embodiment shown in FIG. 14. They also perform error detection of client signals 1701a-2 and 1701b-2 at the time when adjusting the rates of the client signals 1701a-2 and 1701b-2, and moreover, they insert error monitoring information into a specific area in the dummy pattern. Thus, error monitoring is performed for the transmitter side rate adjusting unit 1703-2, 1704-2 through receiver side rate restoring units 1708-2 and 1709-2.

FIGS. 17A and 17B compare the system operations between the case where the error monitoring is provided and the case where the error monitoring is not provided, when an error occurs between a circuit for performing a rate adjustment process using a fixed frame (i.e., the rate adjustment unit) and a circuit for performing a digital frame process for transmission (i.e., the transmitter side transmission device).

In the case that error monitoring is not provided, a receiver side transmission device 1707-1 does not detect errors, and only client devices 1700e-1 and 1700f-1 detect errors. Since errors are detected only by the client devices 1700e-1 and 1700f-1, it is impossible to specify where the error has occurred in the system.

In the case where error monitoring is provided, the rate adjusting units 1703-2 and 1704-2 can confirm by the client signal error monitoring that the accommodated client signals contain no error. Next, an error is not detected at receiver side transmission device 1707-2, and an error is detected at the rate restoring units 1708-2 and 1709-2, which have the same functions as the rate restoring units 1408 and 1409 in the embodiment shown in FIG. 14, and at client devices 1700e-2 and 1700f-2. Since no error is detected in the transmission device section, it is determined that the error has occurred either in a section from the transmitter side rate adjusting unit 1703-2 and 1704-2 through a transmitter side transmission device 1705-2, or in a section from the receiver side transmission device 1707-2 to the rate restoring units 1708-2 and 1709-2. CRC, BIP, or the like used in Ethernet or SDH may be used as the error monitoring information that is to be inserted in a specific area of the dummy pattern.

It should be noted that this embodiment shows that the rate adjusting units are provided outside the transmission device, but it is possible that the rate adjusting units may be provided between a client accommodating unit (not shown) and a frame processing unit (not shown) in the transmission device.

Figure 18:
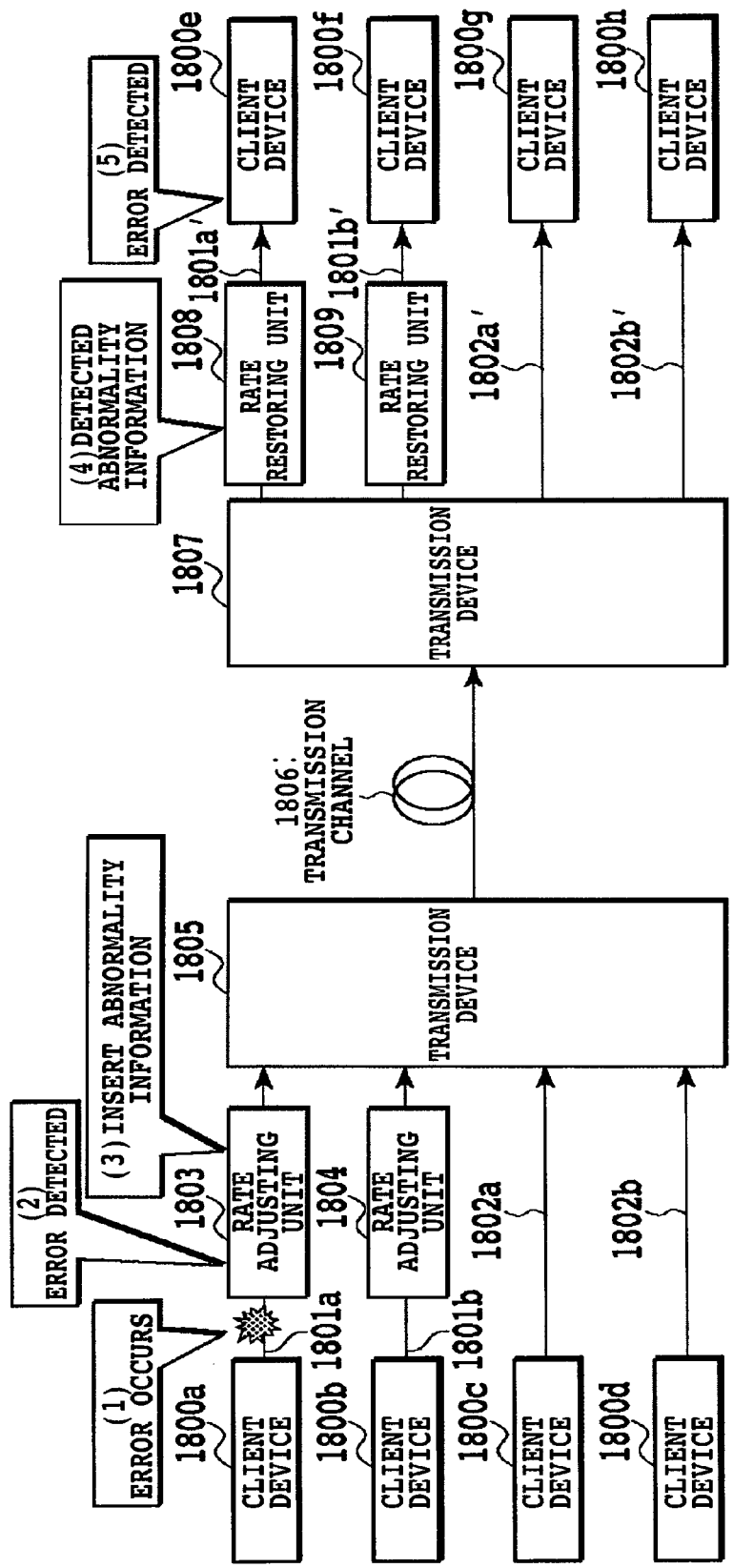
FIG. 18 is a view showing a basic block configuration of a digital transmission system, according to one embodiment of the invention, in which a plurality of types of client signals having different bit rates are multiplexed and transmitted.

FIG. 18 is a view showing a basic block configuration of a digital transmission system, according to one embodiment of the invention, in which a plurality of types of client signals having different bit rates are multiplexed and transmitted. When abnormality such as a high error rate in a client signal occurs, it is necessary to identify where the abnormality is taking place. In this embodiment, rate adjusting units 1803 and 1804 perform the rate adjustment as executed in the rate adjusting units 1403 and 1404 in the embodiment shown in FIG. 14 and also carry out performance monitoring at the time when rate-adjusting client signals 1801a and 1801b. If abnormality is detected, the rate adjusting units 1803 and 1804 insert a specific pattern according to the abnormal condition into the dummy pattern or an accommodation (payload) area of the client signal, to inform the receiver side of the abnormal condition. By informing the receiver side of the abnormal condition, the receiver side devices, namely, rate restoring units 1808 and 1809 having the same functions as those of the rate restoring units 1408 and 1409 of the embodiment shown in FIG. 14, and client devices 1800e and 1800f, are allowed to recognize the abnormality occurrence position, and to determine whether or not a maintenance action should be taken.

It should be noted that this embodiment shows that the rate adjusting units are provided outside the transmission device, but it is possible that the rate adjusting units may be provided between a client accommodating unit (not shown) and a frame processing unit (not shown) in the transmission device.

Figure 19:
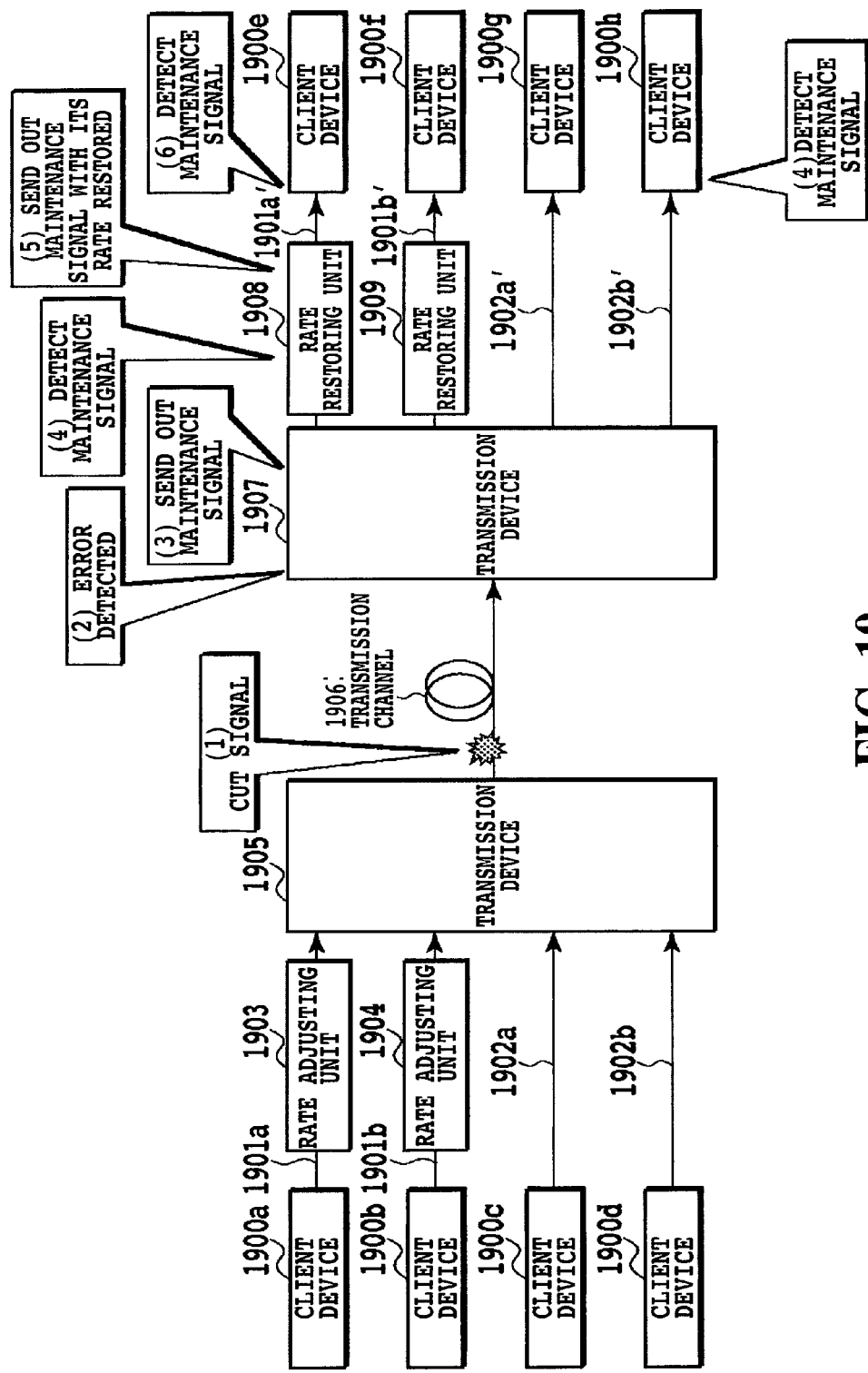
FIG. 19 is a view showing a basic block configuration of a digital transmission system, according to one embodiment of the invention, in which a plurality of types of client signals having different bit rates are multiplexed and transmitted.

FIG. 19 is a view showing a basic block configuration of a digital transmission system, according to one embodiment of the invention, in which a plurality of types of client signals having different bit rates are multiplexed and transmitted. In this embodiment, rate adjusting units 1903 and 1904 may be the same rate adjusting units in the embodiments shown in FIGS. 14, 17B, and 18. When detecting a signal cut-off in a transmission channel 1906, a receiver side transmission device 1907 sends out Generic-AIS (Alarm Indication Signal) signals 1901a', 1901b', 1902a', and 1902b' to the receiver client side, to inform client devices 1900e, 1900f, 1900g, and 1900h that there has been abnormality in an upstream signal. In the case that the rate restoring process is performed by rate restoring units 1908 and 1909, which have the same functions as the rate restoring units 1408 and 1409 in the embodiment shown in FIG. 14, the Generic-AIS signals (i.e., maintenance signals) 1901a' and 1901b' need to be transferred to the client devices 1900e and 1900f. In the case that a maintenance signal indicating abnormality in an upstream signal is detected from the digital frame processing unit for transmission (i.e., the receiver side transmission device 1907) when performing rate restoring in the rate restoring units 1908 and 1909, the same maintenance signals 1901a' and 1901b' are sent out to the client devices 1900e and 1900f at the bit rate after the rate restoring. This allows the client devices 1900e and 1900f to detect the abnormal condition.

When an SDH device is used as the transmission device, MS-AIS (Multiplex Section-Alarm Indication Signal) signal is used as the maintenance signal. In the cases that the rate adjustment process and the rate restoring process are performed in the rate adjusting units and the rate restoring units as well, the maintenance signal needs to be transmitted to the receiver side client devices. Therefore, when a rate restoring unit has detected a maintenance signal, a maintenance signal that is the same as the detected maintenance signal is output with a bit rate of the client signal that has undergone the rate restoring, to inform the receiver side client devices of the failure condition.

It should be noted that this embodiment shows that the rate adjusting units are provided outside the transmission device, but it is possible that the rate adjusting units may be provided between a client accommodating unit (not shown) and a frame processing unit (not shown) in the transmission device.

Figure 20:
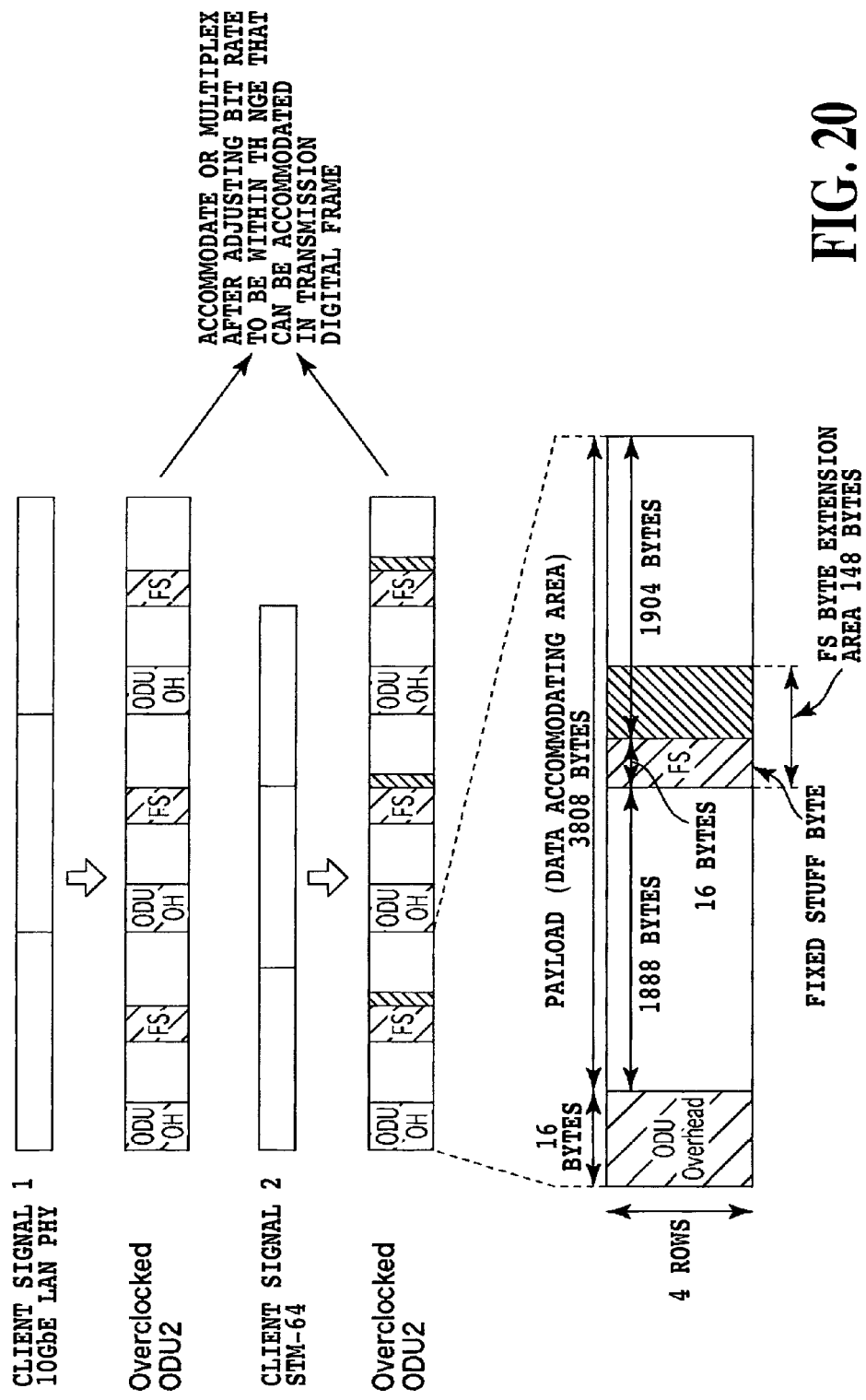
FIG. 20 is a view showing one example of an ODU frame structure used in a digital transmission system, according to one embodiment of the invention, in which a plurality of types of client signals having different bit rates are multiplexed and transmitted.

FIG. 20 is a configuration view showing an ODU frame structure used in a digital transmission system, according to one embodiment of the invention, in which a plurality of types of client signals having different bit rates are multiplexed and transmitted. In this embodiment, unlike the embodiments shown in FIGS. 14, 17B, 18, and 19, a frame processing unit (not shown) in the transmitter side transmission device also carries out the rate adjustment, and the transmitter side transmission device inserts a dummy pattern in a specific area of a digital frame for transmission to construct a fixed frame, whereby the rate adjustment for client signal is realized. In a transmitter side transmission device, the client signal is first accommodated in an ODU frame, and subsequently accommodated or multiplexed in an OTU frame, in the process of multiplexing a client signal in the OTU frame. The 10 GbE LAN PHY signal is accommodated in the overclocked ODU frame as it is, without being subjected to any processing. In this embodiment, the transmission device performs the process for the rate adjustment integrally with the digital frame for transmission, so it is unnecessary to take frame synchronization newly. Moreover, it is unnecessary to provide the informing functions of performance monitoring and failure conditions, so the rate adjustment is possible with a minimum circuit configuration.

One example of the configuration diagram of an ODU frame structure is shown in a lower portion of FIG. 20. In the ODU frame, an FS byte may be inserted into a specific position of the payload area as a dummy pattern, in order to match the bit rate of the multiplex signal of the ODU frame in which a lower speed client signal is accommodated and the bit rate of the case in which the client signal is accommodated in the payload area without being multiplexed. Normally, when accommodating a 10 Gbit/s client signal the FS byte is inserted to be a range of a 16 byte string×4 rows in a payload area with 3808 bytes×4 rows. However, when accommodating a STM-64 signal, the rate adjustment is performed by expanding the FS byte area from 16 bytes to 148 bytes. By changing the FS byte area into a 148 byte string, the STM-64 signal is rate-converted at a rate of (3808−16)/(3808−148), to result in a bit rate of 10.3125 Gbit/s−24.2 ppm, so it can be multiplexed with the ODU frame in which the 10 GbE LAN PHY signal is accommodated. Thus, the rate adjustment is made possible with a minimum circuit modification by changing the insertion range of the FS byte. Although the FS byte is inserted in one area in this embodiment, it is possible that the FS byte may be divided and inserted into a plurality of locations. It is also possible that the FS byte may not be inserted by a byte string unit but the insertion range may be set by a byte unit. By this rate adjustment, the rate-adjusted STM-64 signal can be contained in the range of the bit rate of the 10 GbE LAN PHY signal, 10.3125 Gbit/s±100 ppm, so the STM-64 signal can be accommodated or multiplexed in the same way as the 10.3125 Gbit/s client signal.

Various embodiments of transmitting client signal by time-division multiplexing have been described, but the client signal may be transmitted by wavelength division multiplexing, without being subjected to time-division multiplexing. In this case, the transmission bit rates of the transmission devices can be made equal for various wavelengths, so the costs of the optical transmission-reception module and the frame processing circuit can be reduced.

The invention claimed is:

1. A digital transmission system for performing transmission and reception of a signal between a transmitter side network and a receiver side network, the transmitter side network comprising at least a client device and a transmission device, and for rate-adjusting a client signal transmitted from the client device to the transmission device as necessary and accommodating, or accommodating and multiplexing, to an accommodation rate, the transmission device comprises:
a rate adjusting unit for adding, using a frame structure comprising an overhead with a predetermined fixed length and a payload, the overhead to each of fixed length bit segments of the client signal and encapsulating the client signal, and adding an idle pattern as necessary, to the encapsulated client signal, to perform rate adjustment for the client signal to a bit rate that can be accommodated in the accommodation rate; and
a framer processing unit for accommodating, or accommodating and multiplexing, the rate-adjusted encapsulated client signal to the accommodation rate,
wherein a bit string of the client signal is accommodated, or accommodated and multiplexed, directly in the payload portion, or is accommodated, or accommodated and multiplexed, in the payload portion after subjecting it to a reversible digital signal processing,
wherein the frame structure comprises a GFP (Generic Framing Procedure) frame structure,
wherein, the rate adjusting unit is configured, when detecting an alarm signal indicating abnormality of the client signal, to insert a specific bit pattern according to an abnormal condition indicated by the alarm signal into a header area of the GFP, and the abnormal condition is informed of the receiver side network that receives the client signal from the transmission device; and
wherein, in the rate adjusting unit, a predetermined area is provided in a header portion of the frame structure; a predetermined bit pattern is accommodated in the area; and a bit error rate is estimated by counting a bit error of the area in the receiver side network, to perform performance monitoring of the rate-adjusted client signal in the rate adjusting unit.

2. The digital transmission system according to claim 1, wherein the length of the overhead of the frame structure comprising an overhead having a predetermined fixed length and a payload is either 1 bit or 2 bits.

3. The digital transmission system according to claim 1, wherein
the receiver side network further comprises a second transmission device for receiving a client signal from the transmission device of the transmitter side network, and a second rate adjusting unit within the second transmission device; and
if an alarm signal indicating abnormality of the client signal rate-adjusted in the second rate adjusting unit is detected, the alarm signal is informed to the receiver side network for receiving the client signal.

4. The digital transmission system according to claim 1, wherein
the client signal comprises at least one of a 10 GbE LAN PHY signal and a STM-64 signal; and
the transmission device uses an OTU (Optical-channel Transport Unit) frame of an optical transport network (OTN).

5. The digital transmission system according to claim 1, wherein the rate adjusting unit accommodates, or accommodates and multiplexes, the client signal after subjecting the client signal to be accommodated to a scramble process.

6. A digital transmission method in a digital transmission system for performing transmission and reception of a signal between a transmitter side network and a receiver side network, the transmitter side network comprising at least a client device and a transmission device, and for rate-adjusting a client signal transmitted from the client device to the transmission device as necessary and accommodating, or accommodating and multiplexing, to an accommodation rate, the digital transmission method comprising:

at the transmission device,
adding, using a frame structure comprising an overhead with a predetermined fixed length and a payload, the overhead to each of fixed length bit segments of the client signal and encapsulating the client signal, and adding an idle pattern as necessary, to the encapsulated client signal, to perform rate adjustment for the client signal to a bit rate that can be accommodated in the accommodation rate; and
accommodating, or accommodating and multiplexing, the rate-adjusted encapsulated client signal to the accommodation rate,
wherein a bit string of the client signal is accommodated, or accommodated and multiplexed, directly in the payload portion, or is accommodated, or accommodated and multiplexed, in the payload portion after subjecting it to a reversible digital signal processing,
wherein the frame structure comprises a GFP (Generic Framing Procedure) frame structure,
wherein the method comprises, at the rate adjusting unit, when an alarm signal indicating abnormality of the client signal is detected, inserting a specific bit pattern according to an abnormal condition indicated by the alarm signal into a header area of the GFP to inform of the receiver side network that receives the client signal from the transmission device, and
wherein, the method further comprises:
at the rate adjusting unit, providing a predetermined area in a header portion of the frame structure; accommodating a predetermined bit pattern in the area; and
estimating a bit error rate by counting a bit error of the area in the receiver side network, to perform performance monitoring of the rate-adjusted client signal in the rate adjusting unit.

7. A digital transmission system for transmitting a plurality of types of client signals having different bit rates by accommodating or multiplexing the signals in a digital frame, and outputting the client signals by separating accommodated or multiplexed signals from the received digital frame, the digital transmission system comprising:
rate adjusting device for rate-adjusting the bit rate of the plurality of types of client signals to a bit rate range that can be accommodated in the digital frame transparently by inserting a dummy pattern, using a specific fixed frame, into the fixed frame for client signals other than the client signal having the highest bit rate among the plurality of types of client signals to increase the bit rate of the client signals,
wherein the dummy pattern is inserted for the client signals other than the client signal having the highest bit rate among the plurality of types of client signals so that the number of bits of the dummy pattern and the number of bits of the client signal before the rate adjustment results in a rate M:N (where M and N are natural numbers) to construct the specific fixed frame, and the values N and M are set so that $(B_C \pm A_C) \times (M+N)/N$ results in a bit rate range that can be accommodated in the digital frame, where the bit rate and the frequency accuracy of the client signal are $B_C$ and $\pm A_C$, respectively.

8. The digital transmission system according to claim 7, wherein
the dummy pattern comprises a frame synchronization pattern; and
the digital transmission system further comprises rate restoring device for restoring the rate to an original bit rate of a client signal by discriminating the dummy pattern area using the frame synchronization pattern and deleting the dummy pattern on a receiver side.

9. The digital transmission system according to claim 8, wherein the frame synchronization pattern of the dummy pattern is a different pattern from a frame synchronization pattern of the client signal.

10. The digital transmission system according to claim 8, wherein the dummy pattern comprises a scramble pattern.

11. The digital transmission system according to claim 7, wherein an OTU frame of OTN is used as the digital frame; the plurality of types of client signals comprise a STM-64 signal and a 10 GbE LAN PHY signal; and the rate adjustment is performed by inserting the dummy pattern into the STM-64 signal so that a dummy pattern insertion rate (M/N) is set to be from (9.95328−20 ppm)/((10.3125+100 ppm)−(9.95328−20 ppm)) to (9.95328+20 ppm)/((10.3125−100 ppm)−(9.95328+20 ppm)).

12. The digital transmission system according to claim 11, wherein the plurality of types of client signals are frequency-synchronized by a justification function of an OPU (Optical-channel Payload Unit) contained in the OTU frame used as the digital frame.

13. The digital transmission system according to claim 7, wherein error monitoring is performed using a specific area of the dummy pattern.

14. The digital transmission system according to claim 7, wherein performance monitoring for the client signals is performed when rate-adjusting the client signals, and if abnormality is detected, the rate adjusting device inserts a specific pattern according to the abnormal condition into a payload area of the dummy pattern or a client signal to inform the receiver side of the abnormal condition.

15. The digital transmission system according to claim 8, wherein, if a maintenance signal indicating abnormality of an upstream signal is detected from a receiver side digital frame processing unit when performing rate restoring, the rate restoring device sends out the maintenance signal at a bit rate after the rate restoring.

16. The digital transmission system according to claim 7, wherein the specific fixed frame is constructed by inserting the dummy pattern into a specific area of a payload area of the digital frame.

17. The digital transmission system according to claim 16, wherein an OTU frame of OTN is used as the digital frame, and a FS (Fixed Stuff) byte whose insert range has been changed is used as the dummy pattern.

18. The digital transmission system according to claim 17, wherein the plurality of types of client signals comprise a STM-64 signal and a 10 GbE LAN PHY signal, and the range of the FS byte to be inserted to a payload area of the OTU frame is set to be 148 bytes×4 rows for the STM-64 signal, when performing the rate adjustment.

19. A digital transmission method for transmitting a plurality of types of client signals having different bit rates by accommodating or multiplexing the signals in a digital frame, and outputting the client signals by separating accommodated or multiplexed signals from the received digital frame, the digital transmission method comprising:
adjusting bit rate of the plurality of types of client signals to a bit rate range that can be accommodated in the digital frame transparently by inserting a dummy pattern, using a specific fixed frame, into the fixed frame for client signals other than the client signal having the highest bit rate among the plurality of types of client signals to increase the bit rate of the client signals,
wherein the dummy pattern is inserted for the client signals other than the client signal having the highest bit rate among the plurality of types of client signals so that the number of bits of the dummy pattern and the number of bits of the client signal before the rate adjustment results in a rate M:N (where M and N are natural numbers) to construct the specific fixed frame, and the values N and M are set so that $(B_C \pm A_C) \times (M+N)/N$ results in a bit rate range that can be accommodated in the digital frame, where the bit rate and the frequency accuracy of the client signal are $B_C$ and $\pm A_C$, respectively.

20. The digital transmission system according to claim 2, wherein in the rate adjusting unit, a predetermined area is provided in a header portion of the frame structure; a predetermined bit pattern is accommodated in the area; and a bit error rate is estimated by counting a bit error of the area in the receiver side network, to perform performance monitoring of the rate-adjusted client signal in the rate adjusting unit.

\* \* \* \* \*